United States Patent
Blink et al.

(10) Patent No.: US 10,427,006 B2
(45) Date of Patent: *Oct. 1, 2019

(54) GOLF BALL INCORPORATING AT LEAST ONE LAYER OF PLASTICIZED NEUTRALIZED ACID POLYMER COMPOSITION CONTAINING LOW MOLECULAR WEIGHT ACID WAX(ES) AS SOLE ACID POLYMER COMPONENT AND LOW MOLECULAR WEIGHT NON-ACID WAX(ES) IN THE NON-ACID POLYMER COMPONENT

(71) Applicant: Acushnet Company, Fairhaven, MA (US)

(72) Inventors: Robert Blink, Newport, RI (US); David A. Bulpett, Boston, MA (US); Michael J. Sullivan, Old Lyme, CT (US); Brian Comeau, Berkley, MA (US); Mark L. Binette, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/139,262

(22) Filed: Sep. 24, 2018

(65) Prior Publication Data

US 2019/0022470 A1 Jan. 24, 2019

Related U.S. Application Data

(63) Continuation-in-part of application No. 15/431,883, filed on Feb. 14, 2017, now Pat. No. 10,105,576, which is a continuation-in-part of application No. 14/588,317, filed on Dec. 31, 2014, now Pat. No. 9,656,128, which is a continuation-in-part of application No. 14/522,784, filed on Oct. 24, 2014, now abandoned, which is a continuation-in-part of
(Continued)

(51) Int. Cl.
| | | |
|---|---|---|
| A63B 37/06 | (2006.01) |
| A63B 37/00 | (2006.01) |
| C08L 33/10 | (2006.01) |
| C08L 33/08 | (2006.01) |
| C08K 5/101 | (2006.01) |
| C08K 5/098 | (2006.01) |
| C08F 210/02 | (2006.01) |
| C08F 220/18 | (2006.01) |
| C08K 5/521 | (2006.01) |
| C08L 33/02 | (2006.01) |

(52) U.S. Cl.
CPC ........ *A63B 37/0051* (2013.01); *A63B 37/006* (2013.01); *A63B 37/0024* (2013.01); *A63B 37/0036* (2013.01); *A63B 37/0039* (2013.01); *A63B 37/0043* (2013.01); *A63B 37/0048* (2013.01); *A63B 37/0062* (2013.01); *A63B 37/0064* (2013.01); *A63B 37/0076* (2013.01); *A63B 37/0078* (2013.01); *A63B 37/0087* (2013.01); *A63B 37/0092* (2013.01); *C08F 210/02* (2013.01); *C08F 220/18* (2013.01); *C08K 5/098* (2013.01); *C08K 5/101* (2013.01); *C08K 5/521* (2013.01); *C08L 33/02* (2013.01); *C08L 33/08* (2013.01); *C08L 33/10* (2013.01); *A63B 37/0031* (2013.01); *A63B 37/0074* (2013.01); *A63B 37/0075* (2013.01); *A63B 2037/0079* (2013.01); *C08F 2500/02* (2013.01); *C08F 2500/12* (2013.01); *C08F 2500/17* (2013.01)

(58) Field of Classification Search
CPC .................................... A63B 37/0077
USPC ........................................ 473/371
See application file for complete search history.

(56) References Cited

U.S. PATENT DOCUMENTS

| | | |
|---|---|---|
| 4,625,964 A | 12/1986 | Yamada |
| 5,048,838 A | 9/1991 | Chikaraishi et al. |

(Continued)

OTHER PUBLICATIONS

Dupont, Hardness Conversion, uploaded Oct. 4, 2016, Dupont, 1 page.

(Continued)

*Primary Examiner* — Raeann Gorden
(74) *Attorney, Agent, or Firm* — Margaret C. Barker

(57) ABSTRACT

Golf ball comprising layer(s) comprised of plasticized neutralized acid polymer composition consisting of mixture of: (a) low molecular weight acid-containing wax(es); (b) non-acid-polymer(s) including at least one low molecular weight non-acid wax such as high density oxidized polyethylene homopolymers; ethylene maleic anhydride copolymers; polypropylene maleic anhydride copolymers; polypropylene homopolymers; ethylene-vinyl acetate copolymers; high density oxidized homopolymers; oxidized copolymers; polyethylene micronized waxes; polytetrafluoroethylene micronized waxes; emulsifiable low molecular weight non-acid waxes; non-emulsifiable low molecular weight non-acid waxes; and/or chemically modified low molecular weight non-acid waxes; (c) organic acid(s) or salt thereof; and (d) plasticizer(s). Molecular weight of each low molecular weight acid-containing wax is about 500 to 7000, or up to 30,000. Interactions between components (a), (b), (c) and (d) advantageously produce layer of ionomeric material having heat stability, processability, and well-retained durability, adhesion, CoR, compression and softer feel without need for blending high and low molecular weight acid-containing polymer(s).

32 Claims, No Drawings

Related U.S. Application Data application No. 14/145,633, filed on Dec. 31, 2013, which is a continuation-in-part of application No. 14/145,616, filed on Dec. 31, 2013, now abandoned, which is a continuation-in-part of application No. 14/145,593, filed on Dec. 31, 2013, now Pat. No. 9,427,630, which is a continuation-in-part of application No. 14/145,578, filed on Dec. 31, 2013, now Pat. No. 9,573,022.

(56) References Cited

U.S. PATENT DOCUMENTS

| | | | |
|---|---|---|---|
| 5,104,126 | A | 4/1992 | Gentiluomo |
| 5,306,760 | A | 4/1994 | Sullivan |
| 5,334,673 | A | 8/1994 | Wu |
| 5,480,155 | A | 1/1996 | Molitor et al. |
| 5,482,285 | A | 1/1996 | Yabuki et al. |
| 5,484,870 | A | 1/1996 | Wu |
| 6,277,034 | B1 | 8/2001 | Nesbitt et al. |
| 6,315,683 | B1 | 11/2001 | Yoshida et al. |
| 6,416,425 | B1 | 7/2002 | Maruko et al. |
| 6,419,595 | B1 | 7/2002 | Maruko et al. |
| 6,461,251 | B1 | 10/2002 | Yamagishi et al. |
| 6,494,795 | B2 | 12/2002 | Sullivan |
| 6,500,076 | B1 | 12/2002 | Morgan et al. |
| 6,506,851 | B2 | 1/2003 | Wu |
| 6,527,652 | B1 | 3/2003 | Maruko et al. |
| 6,596,815 | B1 | 7/2003 | Feinberg |
| 6,688,991 | B2 | 2/2004 | Sullivan et al. |
| 6,692,380 | B2 | 2/2004 | Sullivan et al. |
| 6,756,436 | B2 | 6/2004 | Rajagopalan et al. |
| 6,756,443 | B2 | 6/2004 | Feinberg |
| 6,762,246 | B2 | 7/2004 | Chen |
| 6,815,480 | B2 | 11/2004 | Statz et al. |
| 6,835,794 | B2 | 12/2004 | Wu et al. |
| 6,894,098 | B2 | 5/2005 | Rajagopalan et al. |
| 6,986,717 | B2 | 1/2006 | Morgan et al. |
| 7,037,967 | B2 | 5/2006 | Chen |
| 7,041,721 | B2 | 5/2006 | Rajagopalan et al. |
| 7,259,191 | B2 | 8/2007 | Sullivan et al. |
| 7,273,903 | B2 | 9/2007 | Chen |
| 7,331,878 | B2 | 2/2008 | Boehm et al. |
| 7,365,128 | B2 | 4/2008 | Sullivan |
| 7,410,429 | B1 | 8/2008 | Bulpett et al. |
| 7,452,291 | B2 | 11/2008 | Sullivan et al. |
| 7,488,778 | B2 | 2/2009 | Chen |
| 7,537,529 | B2 | 5/2009 | Bulpett et al. |
| 7,537,530 | B2 | 5/2009 | Bulpett et al. |
| 7,591,742 | B2 | 9/2009 | Sullivan et al. |
| 7,612,134 | B2 | 11/2009 | Kennedy, III et al. |
| 7,612,135 | B2 | 11/2009 | Kennedy, III et al. |
| 7,642,319 | B2 | 1/2010 | Sullivan et al. |
| 7,744,489 | B2 | 6/2010 | Sullivan et al. |
| 7,744,490 | B2 | 6/2010 | Sullivan et al. |
| 7,815,526 | B2 | 10/2010 | Sullivan et al. |
| 7,946,934 | B2 | 5/2011 | Sullivan et al. |
| 8,088,026 | B2 | 1/2012 | Chen et al. |
| 8,137,214 | B2 | 3/2012 | Sullivan et al. |
| 8,152,655 | B2 | 4/2012 | Comeau et al. |
| 8,163,823 | B2 | 4/2012 | Sullivan et al. |
| 8,193,283 | B2 | 6/2012 | Chen |
| 8,265,508 | B2 | 9/2012 | Nakamura et al. |
| 8,410,220 | B2 | 4/2013 | Chen |
| 10,105,576 | B2* | 10/2018 | Bulpett .............. A63B 37/0039 |
| 2001/0014446 | A1 | 8/2001 | Heroux et al. |
| 2003/0013549 | A1 | 1/2003 | Rajagopalan et al. |
| 2004/0106736 | A1* | 6/2004 | Takesue .................. C08F 8/44 |
| | | | 525/196 |
| 2006/0073914 | A1 | 4/2006 | Sullivan et al. |
| 2007/0155542 | A1 | 7/2007 | Sullivan et al. |
| 2008/0220902 | A1 | 9/2008 | Sullivan et al. |
| 2008/0220903 | A1 | 9/2008 | Sullivan et al. |
| 2008/0227568 | A1 | 9/2008 | Sullivan et al. |
| 2008/0242448 | A1 | 10/2008 | Sullivan et al. |
| 2008/0261723 | A1 | 10/2008 | Sullivan et al. |
| 2009/0203469 | A1 | 8/2009 | Sullivan |
| 2010/0099517 | A1 | 4/2010 | Comeau et al. |
| 2011/0275456 | A1 | 11/2011 | Sullivan et al. |
| 2011/0312441 | A1 | 12/2011 | Sullivan et al. |
| 2012/0122610 | A1 | 5/2012 | Sullivan et al. |
| 2014/0194222 | A1 | 7/2014 | Sullivan et al. |
| 2014/0194223 | A1 | 7/2014 | Sullivan et al. |
| 2014/0194224 | A1 | 7/2014 | Sullivan et al. |
| 2014/0194225 | A1 | 7/2014 | Sullivan et al. |

OTHER PUBLICATIONS

Rick White, Shore Durometer Conversion Chart, uploaded Oct. 4, 2016, Thermal Tech Equipment, 1 page.
Honeywell A-0580 product brochure; Jan. 2008.
Dalton, Jeff, "Compression by Any Other Name, Science and Golf IV, Proceedings of the World Scientific Congress of Golf ( Eric Thain ed., Routledge, 2002)(1 Dalton").

* cited by examiner

GOLF BALL INCORPORATING AT LEAST ONE LAYER OF PLASTICIZED NEUTRALIZED ACID POLYMER COMPOSITION CONTAINING LOW MOLECULAR WEIGHT ACID WAX(ES) AS SOLE ACID POLYMER COMPONENT AND LOW MOLECULAR WEIGHT NON-ACID WAX(ES) IN THE NON-ACID POLYMER COMPONENT

CROSS REFERENCE TO RELATED APPLICATIONS

This application is a continuation-in-part of co-pending U.S. patent application Ser. No. 15/431,883, filed Feb. 14, 2017, which is a continuation-in-part of co-pending U.S. patent application Ser. No. 14/588,317, filed Dec. 31, 2014, which is a continuation-in-part of U.S. patent application Ser. No. 14/145,593, filed Dec. 31, 2013, now U.S. Pat. No. 9,427,630. This application is also a continuation-in-part of co-pending U.S. application Ser. Nos. 14/145,578, 14/145,616, and 14/145,633, each filed on Dec. 31, 2013. This application is meanwhile a continuation-in-part of co-pending U.S. application Ser. No. 14/522,784, filed Oct. 24, 2014. The entire disclosure of each of these related applications is hereby incorporated herein by reference.

FIELD OF THE INVENTION

The present invention relates to golf balls incorporating plasticized very and/or highly neutralized acid polymer compositions.

BACKGROUND OF THE INVENTION

Conventional golf balls can be divided into two general classes: solid and wound. Solid golf balls include one-piece, two-piece (i.e., single layer core and single layer cover), and multi-layer (i.e., solid core of one or more layers and/or a cover of one or more layers) golf balls. Wound golf balls typically include a solid, hollow, or fluid-filled center, surrounded by a tensioned elastomeric material, and a cover.

Golf balls are typically constructed with polymer compositions including, for example, polybutadiene rubber, polyurethanes, polyamides, ionomers, and blends thereof. Playing characteristics of golf balls, such as spin, feel, CoR and compression can be tailored by varying the properties of the golf ball materials and/or adding additional golf ball layers such as at least one intermediate layer disposed between the cover and the core. Intermediate layers can be of solid construction, and have also been formed of a tensioned elastomeric winding. The difference in play characteristics resulting from modification(s) of golf ball materials and/or construction can be quite significant.

Ionomers, particularly ethylene-based ionomers, are a preferred group of polymers for golf ball layers because of their toughness, durability, and wide range of hardness values. Ionomers initially became popular golf ball cover materials due to their excellent impact resistance and their thermoplasticity, which permits the material to be economically applied via injection or compression molding techniques.

Golf ball manufacturers have blended high molecular weight acid-containing polymers and low molecular weight acid-containing polymers because each is known to have drawbacks when used in golf ball ionomer compositions. On the one hand, high molecular weight acid-containing polymers tend to produce compositions having excellent physical properties such as heat stability, yet suffer from low melt flow and attendant poor processability. On the other hand, low molecular weight acid-containing polymers generally result in compositions having excellent melt flow, yet poor physical properties such as heat stability. Blending of high and low molecular weight acid-containing polymers has been found to overcome these drawbacks and achieve an acceptable balance between good physical properties (such as heat stability) and melt flow (processability).

However, it would be more efficient and cost effective to develop improved ionomeric formulations that don't require blending high and low molecular weight acid-containing polymers—especially those which meanwhile retain original properties well. In this regard, it can be difficult for a material to retain its original properties long term when problems occur such as migration of ingredients within and between adjacent golf ball layers. This generally changes the material, which can alter important golf ball properties including durability, adhesion, resilience (CoR), compression, and soft feel.

There is therefore a need for such improved ionomeric layer formulations and golf balls containing same, which would be particularly useful if producible within existing golf ball manufacturing systems. Golf balls of the present invention and the methods of making same address and solve this need.

SUMMARY OF THE INVENTION

Accordingly, a golf ball of the invention incorporates at least one layer comprising a plasticized neutralized acid polymer composition incorporating at least one low molecular weight non-acid wax in the non-acid polymer component of the mixture and meanwhile including low molecular weight acid-containing waxes rather than blending high and low molecular weight acid polymers. The resulting composition displays excellent melt flow/processability and heat stability yet advantageously retains desired golf ball properties and characteristics well due to improvements such as controlled migration of ingredients within and between adjacent layers, thereby creating longer golf ball shelf-life.

Incorporating at least on low molecular weight non-acid wax in the inventive plasticized neutralized acid polymer composition facilitates, controls and improves retention of the originally targeted properties in the resulting material such as durability, adhesion, resilience (CoR), compression, and soft feel due at least in part to interactions between the at least one low molecular weight non-acid wax of component (b) and the ingredients of components (a), (c), and (d).

In one embodiment, a golf ball of the invention comprises at least one layer comprised of the plasticized neutralized acid polymer composition consisting of a mixture of: (a) at least one low molecular weight acid-containing wax; (b) at least one non-acid-polymer, of which at least one is a low molecular weight non-acid wax; (c) at least one organic acid or salt thereof; and (d) at least one plasticizer; wherein each low molecular weight acid-containing wax has a molecular weight of from about 500 to about 30,000; wherein the mixture may contain at least 70 percent of neutralized acid groups; and wherein the mixture has a melt flow index of at least 0.5 g/10 min.

In one embodiment, the low molecular weight non-acid wax is selected from the group consisting of: high density oxidized polyethylene homopolymers; ethylene maleic anhydride copolymers; polypropylene maleic anhydride copolymers; polypropylene homopolymers; ethylene-vinyl acetate copolymers; high density oxidized homopolymers; oxidized copolymers; polyethylene micronized waxes; polytetrafluoroethylene micronized waxes; emulsifiable low molecular weight non-acid waxes; non-emulsifiable low molecular weight non-acid waxes; chemically modified low molecular weight non-acid waxes, and combinations thereof.

In a particular embodiment, at least one low molecular weight non-acid wax may be included in a blend of non-acid-polymers in an amount of at least 50 wt. % based on the total weight of the blend. In another embodiment, at least one low molecular weight non-acid wax may be included in a blend of non-acid-polymers in an amount of less than 50 wt. % based on the total weight of the blend. In a specific such embodiment, the at least one low molecular weight non-acid wax is included in the blend in an amount of from about 10 wt. % to 50 wt. % based on the total weight of the blend.

The at least one low molecular weight non-acid wax is generally included in the mixture in an amount of no greater than 35 wt. % based on the total weight of the mixture. In a specific embodiment, the at least one low molecular weight non-acid wax is included in the mixture in an amount of from about 5 wt. % to about 30 wt. % based on the total weight of the mixture.

Component (a) may be included in an amount of 5 to 95 parts of each 100 parts of components (a) and (b) combined. Component (b) may be included in an amount of from about 5 to 95 parts of each 100 parts of components (a) and (b) combined. Component (c) may be included in an amount of from 5 to 100 parts per 100 parts of components (a) and (b) combined. Meanwhile, component (d) may be included in an amount of from about 1.0 parts to about 300 parts per 100 parts of components (a) and (b) combined.

In a particular embodiment, component (a) may be included in the mixture in an amount of about 70-80 wt % of each 100 wt % of components (a) and (b) combined, component (b) may be included in the mixture in an amount of about 20-30 wt % of each 100 wt % of components (a) and (b) combined, component (c) may be included in the mixture in an amount of about 35-45 wt % per 100 wt % of components (a) and (b) combined; and component (d) may be included in the mixture in an amount of about 0.5-80 wt % of each 100 wt % of components (a) and (b) and (d) combined.

In another particular embodiment, each low molecular weight acid-containing wax may have a molecular weight of from about 500 to about 7,000.

In one embodiment, the mixture may contain at least 80 percent of neutralized acid groups. In another embodiment, the mixture may contain at least 90 percent of neutralized acid groups. In yet another embodiment, the mixture may contain 100 percent of neutralized acid groups. In still another embodiment, the mixture may contain a sufficient amount of a cation source to neutralize greater than about 100% of all acid groups present.

In one embodiment, the at least one organic acid or salt thereof is a fatty acid or fatty acid salt, or blends thereof. In a particular embodiment, the at least one organic acid or salt thereof may be selected from the group consisting of Magnesium Oleate, Magnesium Stearate, or combinations thereof.

In one embodiment, the low molecular weight acid-containing wax may be selected from the group consisting of ethylene acrylic acid copolymers, ethylene-meth acrylic acid copolymers, oxidized polyethylene, or combinations thereof. In one embodiment, the non-acid polymer may be selected from the group consisting of ethylene acrylate copolymers; polyether esters; polyether amines; or combinations thereof.

In a particular embodiment, the plasticizer is selected from the group consisting of fatty acid esters, phosphate esters, or mixtures thereof.

In one embodiment, the melt flow index of the mixture may be greater than 1.0 g/10 min. In another embodiment, the melt flow index of the mixture may be from about 1.0 g/10 min to about 4 g/10 min.

The resulting golf ball may have a CoR of from about 0.740 to about 0.840. The golf ball may also have a compression of from about 40 to about 135.

In a different embodiment, a golf ball of the invention comprises at least one layer consisting of the plasticized neutralized acid polymer composition consisting of a mixture of: (a) at least one low molecular weight acid-containing wax; (b) at least one non-acid-polymer, of which at least one is a low molecular weight non-acid wax; (c) at least one organic acid or salt thereof; and (d) at least one plasticizer; wherein each low molecular weight acid-containing wax has a molecular weight of from about 500 to about 30,000; wherein the mixture may contain at least 70 percent of neutralized acid groups; and wherein the mixture has a melt flow index of at least 0.5 g/10 min.

The invention also relates to a method of making a golf ball of the invention, comprising forming at least one of an innermost layer or outer layer that is comprised of a neutralized acid polymer composition, by (i) mixing: (a) at least one low molecular weight acid-containing wax; (b) at least one non-acid-polymer, of which at least one is a low molecular weight non-acid wax; (c) at least one organic acid or salt thereof; and (d) at least one plasticizer; wherein each low molecular weight acid-containing wax has a molecular weight of from about 500 to about 30,000; and (ii) neutralizing at least 70 percent of acid groups present; such that the plasticized neutralized acid polymer composition has a melt flow index of at least 0.5 g/10 min. These steps, conditions and properties may be further refined or tailored as discussed herein, for example with respect to: the molecular weight of each low molecular weight acid-containing wax, amounts of each component, melt flow index of resulting plasticized neutralized acid polymer composition, Brookfield viscosity of each low molecular weight acid-containing wax, density of each low molecular weight acid-containing wax, percent neutralization of acid groups present in the mixture, and/or type or amount of plasticizer (or both), etc.

DETAILED DESCRIPTION

Advantageously, a golf ball of the invention incorporates at least one layer of plasticized neutralized acid polymer composition that displays excellent melt flow/processability and heat stability yet retains desired golf ball properties and characteristics well, thereby creating longer golf ball shelf-life. This is achieved by incorporating at least one low molecular weight non-acid wax in the non-acid polymer component of the mixture and meanwhile including at least one low molecular weight acid wax rather than blending high and low molecular weight acid polymers. Otherwise, short-term changes can occur within the resulting plasticized neutralized acid polymer composition that would negatively impact the original properties of the material and therefore also original overall golf ball performance.

In one embodiment, the at least one layer consists of a four-component mixture of (a) at least one low molecular weight acid-containing wax; (b) at least one non-acidpolymer, of which at least one is a low molecular weight non-acid wax; (c) at least one organic acid or salt thereof; and (d) at least one plasticizer.

Golf ball shelf-life is an important consideration. Degradation/deterioration or other change in the original resulting desired properties can occur due for example to migration of ingredients within the layer of neutralized acid polymer composition. Incorporating at least on low molecular weight non-acid wax in the inventive plasticized neutralized acid polymer composition facilitates, controls and improves retention of the resulting material's original targeted properties such as durability, adhesion, resilience (CoR), compression, and soft feel, due at least in part to interactions between the at least one low molecular weight non-acid wax of component (b) and the ingredients of components (a), (c), and (d), the plasticized neutralized acid polymer compositions as disclosed herein. And this improvement is desirably produced without the need for blending high and low molecular weight acid-containing polymer(s) and meanwhile in a wide range of softer feels without sacrificing physical properties, processability and/or desirable playing characteristics.

And this improvement is desirably produced without the need for blending high and low molecular weight acid-containing polymer(s) and meanwhile in a wide range of softer feels without sacrificing physical properties, processability and/or desirable playing characteristics. For example, in some embodiments, a golf ball of the invention incorporating at least one layer of plasticized neutralized acid polymer composition can achieve and maintain improved golf ball CoR, particularly at lower compressions and/or hardnesses.

The mixture may contain at least 70 percent of neutralized acid groups, or at least 80 percent of neutralized acid groups, or at least 90 percent of neutralized acid groups, or 100 percent of neutralized acid groups. In fact, in some embodiments, the mixture may contain a sufficient amount of a cation source to neutralize, theoretically, greater than about 100% of all acid groups present, or 105% or greater, or 110% or greater, or 115% or greater, or 120% or greater, or 125% or greater, or 200% or greater, or 250% or greater of all acid groups present.

Excellent melt flow/processability and heat stability of the resulting plasticized neutralized acid polymer composition are achieved using low molecular weight acid-containing wax(es) without high molecular weight acid-containing polymer(s). In this regard, each low molecular weight acid-containing wax may have a molecular weight as low as about 500, or from about 500 to about 7,000, or from about 500 to about 6,000, or from about 500 to about 5,000, or from about 500 to about 4,000, or from about 500 to about 3,000, or from about 500 to about 2,000, or from about 500 to about 1,000, or from about 700 to about 7,000, or from about 700 to about 6,000, or from about 700 to about 5,000, or from about 700 to about 4,000, or from about 700 to about 3,000, or from about 700 to about 2,000, or from about 700 to about 1,000.

Embodiments are envisioned, however, wherein a specific acid-containing wax is considered to have a low molecular weight in the range from about 5,000 to about 15,000, or from about 10,000 to about 20,000, or from about 15,000 to about 25,000, or from about 20,000 to about 30,000, or from about 5,000 to about 10,000, or greater than about 10,000 to about 15,000, or greater than about 15,000 to about 20,000, or greater than about 20,000 to about 25,000, or greater than about 25,000 to about 30,000.

In one embodiment, the low molecular weight acid-containing wax is selected from the group consisting of ethylene acrylic acid copolymers, ethylene-meth acrylic acid copolymers, oxidized polyethylene, or combinations thereof. In one embodiment, the non-acid polymer is selected from the group consisting of ethylene acrylate copolymers; polyether esters; polyether amines; or combinations thereof.

Non-limiting examples of low molecular weight acid-containing waxes include Honeywell ethylene-acrylic acid copolymers A-C® 540, A-C® 540, A-C® 580, A-C® 5120, A-C® 5135, A-C® 5150, and A-C® 5180. See, e.g., any low molecular weight acid-containing waxes that may be identified in TABLE 1:

TABLE 1

| Acid Polymer | Acid (wt %) | Softening Monomer (wt %) | Melt Index (2.16 kg, 190° C., g/10 min) |
|---|---|---|---|
| Nucrel ® 9-1 | methacrylic acid (9.0) | n-butyl acrylate (23.5) | 25 |
| Nucrel ® 599 | methacrylic acid (10.0) | none | 450 |
| Nucrel ® 960 | methyacrylic acid (15.0) | none | 60 |
| Nucrel ® 0407 | methacrylic acid (4.0) | none | 7.5 |
| Nucrel ® 0609 | methacrylic acid (6.0) | none | 9 |
| Nucrel ® 1214 | methacrylic acid (12.0) | none | 13.5 |
| Nucrel ® 2906 | methacrylic acid (19.0) | none | 60 |
| Nucrel ® 2940 | methacrylic acid (19.0) | none | 395 |
| Nucrel ® 30707 | acrylic acid (7.0) | none | 7 |
| Nucrel ® 31001 | acrylic acid (9.5) | none | 1.3 |
| Nucrel ® AE | methacrylic acid (2.0) | isobutyl acrylate (6.0) | 11 |
| Nucrel ® 2806 | acrylic acid (18.0) | none | 60 |
| Nucrel ® 0403 | methacrylic acid (4.0) | none | 3 |
| Nucrel ® 925 | methacrylic acid (15.0) | none | 25 |
| Escor ® AT-310 | acrylic acid (6.5) | methyl acrylate (6.5) | 6 |
| Escor ® AT-325 | acrylic acid (6.0) | methyl acrylate (20.0) | 20 |
| Escor ® AT-320 | acrylic acid (6.0) | methyl acrylate (18.0) | 5 |
| Escor ® 5070 | acrylic acid (9.0) | none | 30 |
| Escor ® 5100 | acrylic acid (11.0) | none | 8.5 |
| Escor ® 5200 | acrylic acid (15.0) | none | 38 |
| A-C ® 5120 | acrylic acid (15) | none | not reported |
| A-C ® 540 | acrylic acid (5) | none | not reported |
| A-C ® 580 | acrylic acid (10) | none | not reported |
| Primacor ® 3150 | acrylic acid (6.5) | none | 5.8 |
| Primacor ® 3330 | acrylic acid (3.0) | none | 11 |
| Primacor ® 5985 | acrylic acid (20.5) | none | 240 |
| Primacor ® 5986 | acrylic acid (20.5) | none | 300 |
| Primacor ® 5980I | acrylic acid (20.5) | none | 300 |

TABLE 1-continued

| Acid Polymer | Acid (wt %) | Softening Monomer (wt %) | Melt Index (2.16 kg, 190° C., g/10 min) |
|---|---|---|---|
| Primacor ® 5990I | acrylic acid (20.0) | none | 1300 |
| XUS 60751.17 | acrylic acid (19.8) | none | 600 |
| XUS 60753.02L | acrylic acid (17.0) | none | 60 |

Nucrel ® acid polymers are commercially available from E. I. du Pont de Nemours and Company.
Escor ® acid polymers are commercially available from ExxonMobil Chemical Company.
A-C ® acid polymers are low molecular weight acid-containing waxes commercially available from Honeywell International Inc.
Primacor ® acid polymers and XUS acid polymers are commercially available from The Dow Chemical Company.

Meanwhile, for purposes of the current invention, low molecular weight non-acid waxes are polymerized from non-acid monomers. Acid groups, if present, are added after polymerization by modifying the polymer through steps such as grafting and/or oxidation.

In one embodiment, the low molecular weight non-acid wax is selected from the group consisting of: high density oxidized polyethylene homopolymers; ethylene maleic anhydride copolymers; polypropylene maleic anhydride copolymers; polypropylene homopolymers; ethylene-vinyl acetate copolymers; high density oxidized homopolymers; oxidized copolymers; polyethylene micronized waxes; polytetrafluoroethylene micronized waxes; emulsifiable low molecular weight non-acid waxes; non-emulsifiable low molecular weight non-acid waxes; chemically modified low molecular weight non-acid waxes, and combinations thereof.

In embodiments wherein component (b) includes one non-acid polymer, the single non-acid polymer is a low molecular weight non-acid wax. Embodiments are envisioned wherein all non-acid polymers of component (b) are low molecular weight non-acid waxes. Embodiments are also envisioned wherein component (b) includes at least two non-acid polymers, of which at least one is not a low molecular weight non-acid wax—as long as at least one of the at least two non-acid polymers is indeed a low molecular weight non-acid wax.

Thus, in one particular embodiment, component (b) consists of one or more low molecular weight non-acid wax. In a different particular embodiment, at least one low molecular weight non-acid wax may be included in a blend of non-acid-polymers in an amount of at least 50 wt. % based on the total weight of the blend. For example, the at least one low molecular weight non-acid wax may be included in the blend in an amount of from 50 wt. % to about 95 wt. %, or from 50 wt. % to about 85 wt. %, or from 50 wt. % to about 75 wt. %, or from about 60 wt. % to about 95 wt. %, or from about 70 wt. % to about 95 wt. %, or from about 80 wt. % to about 95 wt. %, or from about 60 wt. % to about 80 wt. %, or from about 60 wt. % to about 70 wt. %, or from about 70 wt. % to about 80 wt. %, or from 50 wt. % to less than 100 wt. %, or from about 60 wt. % to less than 100 wt. %, based on the total weight of the blend.

In another embodiment, at least one low molecular weight non-acid wax may be included in a blend of non-acid-polymers in an amount of less than 50 wt. % based on the total weight of the blend. In a specific such embodiment, the at least one low molecular weight non-acid wax is included in the blend in an amount of from at least 5 wt. % to less than 50 wt. % based on the total weight of the blend. In other embodiments, the at least one low molecular weight non-acid wax may be included in a blend of non-acid-polymers in an amount of from about 10 wt. % to less than 50 wt. %, or from about 20 wt. % to less than 50 wt. %, or from about 30 wt. % to less than 50 wt. %, or from about 40 wt. % to less than 50 wt. %.

Embodiments are also envisioned wherein the at least one low molecular weight non-acid wax may be included in a blend of non-acid-polymers in an amount of from 5 wt. % to less than 100%, or from about 10 wt. % to about 95 wt. %, or from about 20 wt. % to about 85 wt. %, or from about 30 wt. % to about 75 wt. %, or from about 40 wt. % to about 65 wt. %, or from 45 wt. % to 65 wt. %.

The at least one low molecular weight non-acid wax is generally included in the mixture in an amount of no greater than 35 wt. % based on the total weight of the mixture. In a specific embodiment, the at least one low molecular weight non-acid wax is included in the mixture in an amount of from about 5 wt. % to about 30 wt. % based on the total weight of the mixture. In other embodiments, the at least one low molecular weight non-acid wax is included in the mixture in an amount of from 5 wt. % to 35 wt. %, or from 5 wt. % to about 30 wt. %, or from 5 wt. % to 25 wt. %, or from 5 wt. % to about 25 wt. %, or from 5 wt. % to 20 wt. %, or from 5 wt. % to about 20 wt. %, or from 5 wt. % to 10 wt. %, or from 5 wt. % to about 10 wt. %, or from 10 wt. % to 40 wt. %, or from 15 wt. % 5o 35 wt. %, or from 20 wt. % to 30 wt. % based on the total weight of the mixture.

Non-limiting examples of suitable low molecular weight non-acid waxes include are from Honeywell including: (i) A-C®PE Homopolymers such as A-C®High-Density Oxidized PE Homopolymers; A-C®EVA Copolymers; A-C®Ethylene Maleic Anhydride Copolymers (MAPE); A-C®PP Maleic Anhydride Copolymers (MAPP); A-C®PP Homopolymers; (ii) Homopolymers such as A-C®3A; A-C®6, 6A; A-C®7; A-C®8, 8A; A-C® 9, 9A, 9F; A-C® 16, 16A; A-C® 617, 617A A-C®1810A; A-C®820A; A-C®1702; (iii) Oxidized homopolymers such as A-C®629, 629A; A-C®656; A-C®673A, 673P; A-C® 680, 680A; A-C® 6702; A-C® 680PA, 680P; (iv) High density Oxidized homopolymers such as A-C® 307, 307A; A-C® 316, 316A; A-C® 325; A-C®330; A-C® 392; A-C® 395, 395A; (v) Polypropylene homopolymers such as AC®1089; (vi) Copolymers/ethylene-vinyl acetate such as A-C® 400, 400A; A-C® 405S; A-C® 405M; A-C 405T; (vii) Oxidized copolymers such as A-C® 645P; (viii) Ethylene maleic anhydride copolymers such as A-C® 573A, 573P; (ix) Propylene maleic anhydride copolymers such as A-C® 596P; A-C® 597P; A-C® 950P; (x) PE Micronized waxes such as ACUMIST® Micronized Polyolefin waxes: ACumist® A-6; ACumist® A-12; ACumist® A-18; ACumist® A-45; ACumist® B-6; ACumist® B-9; ACumist® B-12; ACumist® B-18; ACumist® C-5; ACumist® C-12; ACumist® C-18; ACumist® D-5; ACumist®D-9; and/or (xi) PTFE Micronized wax blends such as ACumist® 3105; ACumist® 3205.

Additional non-limiting examples of suitable low molecular weight non-acid waxes are from Westlake Chemical, including: (i) EPOLENE® Emulsifiable Grades of Oxidized Low Molecular Wt. non-acid waxes such as EE-2; E-10; E-14; E-14E; E-16; E-20; (ii) EPOLENE® Chemically Modified Polypropylene Grades such as E-43; (iii) EPOLENE® Nonemulsifiable Grades such as N-10; N-11; N-14; N-15; N-21; N-30; N-34; N-35; (iv) EPOLENE® Emulsifiable Grades such as EE-2; E-10; E-14; E-14E; E-16; E-20; (v) EPOLENE® Chemically Modified Polypropylene Grades such as E-43; and/or (vi) EPOLENE® Nonemulsifiable Grades such as N-10; N-11; N-14; N-15; N-21; N-30; N-34; N-35.

Without being bound to a particular theory, including at least one low molecular weight non-acid wax in component (b) of the four component mixture forming at least one layer of plasticized neutralized acid polymer composition reduces migration of ingredients both within the plasticized neutralized acid polymer composition itself as well as and between that layer and an adjacent layer of material. Such migration can undesirably result in layer shrinkage and hardening, which in turn can reduce adhesion and durability, and change target CoR, and/or compression, negatively impacting desired spin, feel, distance and overall control. Meanwhile, the inventive mixtures have favorable melt flow index which means that the plasticized neutralized acid polymer compositions of the present invention are desirably processable which is important as intractability is sometimes a problem with this class of compositions—e.g., where ionomers are neutralized to a level that they become intractable.

Degree of durability and adhesion quality are generally observed by testing several groups of golf balls periodically over a predetermined time duration using tests such as described further below.

In turn, non-limiting examples of suitable non-acid polymers for blending with the at least one low molecular weight non-acid wax include elastomeric polymers such as:
(a) ethylene-alkyl acrylate polymers, particularly polyethylene-butyl acrylate, polyethylene-methyl acrylate, and polyethylene-ethyl acrylate;
(b) metallocene-catalyzed polymers;
(c) ethylene-butyl acrylate-carbon monoxide polymers and ethylene-vinyl acetate-carbon monoxide polymers;
(d) polyethylene-vinyl acetates;
(e) ethylene-alkyl acrylate polymers containing a cure site monomer;
(f) ethylene-propylene rubbers and ethylene-propylene-diene monomer rubbers;
(g) olefinic ethylene elastomers, particularly ethylene-octene polymers, ethylene-butene polymers, ethylene-propylene polymers, and ethylene-hexene polymers;
(h) styrenic block copolymers;
(i) polyester elastomers;
(j) polyamide elastomers;
(k) polyolefin rubbers, particularly polybutadiene, polyisoprene, and styrene-butadiene rubber; and
(l) thermoplastic polyurethanes.

Examples of particularly suitable commercially available non-acid polymers include, but are not limited to, Lotader® ethylene-alkyl acrylate polymers and Lotryl® ethylene-alkyl acrylate polymers, and particularly Lotader® 4210, 4603, 4700, 4720, 6200, 8200, and AX8900 commercially available from Arkema Corporation; Elvaloy® AC ethylene-alkyl acrylate polymers, and particularly AC 1224, AC 1335, AC 2116, AC3117, AC3427, and AC34035, commercially available from E. I. du Pont de Nemours and Company; Fusabond® elastomeric polymers, such as ethylene vinyl acetates, polyethylenes, metallocene-catalyzed polyethylenes, ethylene propylene rubbers, and polypropylenes, and particularly Fusabond® N525, C190, C250, A560, N416, N493, N614, P614, M603, E100, E158, E226, E265, E528, and E589, commercially available from E. I. du Pont de Nemours and Company; Honeywell A-C polyethylenes and ethylene maleic anhydride copolymers, and particularly A-C 575, A-C 573, and A-C 395, commercially available from Honeywell; Nordel® IP rubber, Elite® polyethylenes, Engage® elastomers, and Amplify® functional polymers, and particularly Amplify® GR 207, GR 208, GR 209, GR 213, GR 216, GR 320, GR 380, and EA 100, commercially available from The Dow Chemical Company; Enable® metallocene polyethylenes, Exact® plastomers, Vistamaxx® propylene-based elastomers, and Vistalon® EPDM rubber, commercially available from ExxonMobil Chemical Company; Starflex® metallocene linear low density polyethylene, commercially available from LyondellBasell; Elvaloy® HP4051, HP441, HP661 and HP662 ethylene-butyl acrylate-carbon monoxide polymers and Elvaloy® 741, 742 and 4924 ethylene-vinyl acetate-carbon monoxide polymers, commercially available from E. I. du Pont de Nemours and Company; Evatane® ethylene-vinyl acetate polymers having a vinyl acetate content of from 18 to 42%, commercially available from Arkema Corporation; Elvax® ethylene-vinyl acetate polymers having a vinyl acetate content of from 7.5 to 40%, commercially available from E. I. du Pont de Nemours and Company; Vamac® G terpolymer of ethylene, methyl acrylate and a cure site monomer, commercially available from E. I. du Pont de Nemours and Company; Vistalon® EPDM rubbers, commercially available from ExxonMobil Chemical Company; Kraton® styrenic block copolymers, and particularly Kraton® FG1901GT, FG1924GT, and RP6670GT, commercially available from Kraton Performance Polymers Inc.; Septon® styrenic block copolymers, commercially available from Kuraray Co., Ltd.; Hytrel® polyester elastomers, and particularly Hytrel® 3078, 4069, and 556, commercially available from E. I. du Pont de Nemours and Company; Riteflex® polyester elastomers, commercially available from Celanese Corporation; Pebax® thermoplastic polyether block amides, and particularly Pebax® 2533, 3533, 4033, and 5533, commercially available from Arkema Inc.; Affinity® and Affinity® GA elastomers, Versify® ethylene-propylene copolymer elastomers, and Infuse® olefin block copolymers, commercially available from The Dow Chemical Company; Exxelor® polymer resins, and particularly Exxelor® PE 1040, PO 1015, PO 1020, VA 1202, VA 1801, VA 1803, and VA 1840, commercially available from ExxonMobil Chemical Company; and Royaltuf® EPDM, and particularly Royaltuf® 498 maleic anhydride modified polyolefin based on an amorphous EPDM and Royaltuf® 485 maleic anhydride modified polyolefin based on an semi-crystalline EPDM, commercially available from Chemtura Corporation.

Additional examples of particularly suitable commercially available elastomeric polymers include, but are not limited to, those given in Table 2 below.

TABLE 2

|  | % Ester | % Maleic Anhydride | Melt Index (2.16 kg, 190° C., g/10 min) |
|---|---|---|---|
| Polyethylene Butyl Acrylates | | | |
| Lotader ® 3210 | 6 | 3.1 | 5 |
| Lotader ® 4210 | 6.5 | 3.6 | 9 |
| Lotader ® 3410 | 17 | 3.1 | 5 |
| Lotryl ® 17BA04 | 16-19 | 0 | 3.5-4.5 |
| Lotryl ® 35BA320 | 33-37 | 0 | 260-350 |
| Elvaloy ® AC 3117 | 17 | 0 | 1.5 |
| Elvaloy ® AC 3427 | 27 | 0 | 4 |
| Elvaloy ® AC 34035 | 35 | 0 | 40 |
| Polyethylene Methyl Acrylates | | | |
| Lotader ® 4503 | 19 | 0.3 | 8 |
| Lotader ® 4603 | 26 | 0.3 | 8 |

TABLE 2-continued

|  | % Ester | % Maleic Anhydride | Melt Index (2.16 kg, 190° C., g/10 min) |
|---|---|---|---|
| Lotader ® AX 8900 | 26 | 8% GMA | 6 |
| Lotryl ® 24MA02 | 23-26 | 0 | 1-3 |
| Elvaloy ® AC 12024S | 24 | 0 | 20 |
| Elvaloy ® AC 1330 | 30 | 0 | 3 |
| Elvaloy ® AC 1335 | 35 | 0 | 3 |
| Elvaloy ® AC 1224 | 24 | 0 | 2 |
| Polyethylene Ethyl Acrylates | | | |
| Lotader ® 6200 | 6.5 | 2.8 | 40 |
| Lotader ® 8200 | 6.5 | 2.8 | 200 |
| Lotader ® LX 4110 | 5 | 3.0 | 5 |
| Lotader ® HX 8290 | 17 | 2.8 | 70 |
| Lotader ® 5500 | 20 | 2.8 | 20 |
| Lotader ® 4700 | 29 | 1.3 | 7 |
| Lotader ® 4720 | 29 | 0.3 | 7 |
| Elvaloy ® AC 2116 | 16 | 0 | 1 |

Acid groups react with a sufficient amount of cation source, in the presence of a high molecular weight organic acid or salt thereof, such that the target amount of all acid groups present are neutralized. Suitable cation sources include metal ions and compounds of alkali metals, alkaline earth metals, and transition metals; metal ions and compounds of rare earth elements; silicone, silane, and silicate derivatives and complex ligands; and combinations thereof. Preferred cation sources are metal ions and compounds of magnesium, sodium, potassium, cesium, calcium, barium, manganese, copper, zinc, tin, lithium, and rare earth metals. The low molecular weight acid-containing wax(es) may be at least partially neutralized prior to contacting the low molecular weight acid-containing wax(es) with the cation source to form the plasticized neutralized acid polymer composition. Methods of preparing ionomers are disclosed, for example, in U.S. Pat. Nos. 3,264,272 and 4,351,931, and U.S. Patent Application Publication No. 2002/0013413.

Suitable high molecular weight organic acids are aliphatic organic acids, aromatic organic acids, saturated monofunctional organic acids, unsaturated monofunctional organic acids, multi-unsaturated monofunctional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof, and combinations thereof. Salts of high molecular weight organic acids comprise the salts, particularly the barium, lithium, sodium, zinc, bismuth, chromium, cobalt, copper, potassium, strontium, titanium, tungsten, magnesium, and calcium salts, of aliphatic organic acids, aromatic organic acids, saturated monofunctional organic acids, unsaturated monofunctional organic acids, multi-unsaturated monofunctional organic acids, dimerized derivatives thereof, and combinations thereof. Suitable organic acids and salts thereof are more fully described, for example, in U.S. Pat. No. 6,756,436, the entire disclosure of which is hereby incorporated herein by reference.

In one embodiment, the at least one organic acid or salt thereof is a fatty acid or fatty acid salt, or blends thereof. In a particular embodiment, the at least one organic acid or salt thereof is selected from the group consisting of Magnesium Oleate, Magnesium Stearate, or combinations thereof.

In one embodiment, the plasticizer is selected from the group consisting of fatty acid esters, phosphate esters, or mixtures thereof.

In a particular embodiment, the plasticizer is selected from N-butylbenzenesulfonamide (BBSA); N-ethylbenzenesulfonamide (EBSA); N-propylbenzenesulfonamide (PBSA); N-butyl-N-dodecylbenzenesulfonamide (BDBSA); N,N-dimethylbenzenesulfonamide (DMBSA); p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl) adipate; and tri-(2-ethylhexyl) phosphate.

In another particular embodiment, the plasticizer is selected from polytetramethylene ether glycol, e.g., Poly-THF™ 250, commercially available from BASF; propylene carbonate, e.g., Jeffsol™ PC propylene carbonate, commercially available from Huntsman Corp.; dipropyleneglycol dibenzoate, e.g., Benzoflex™ 284 plasticizer, commercially available from Eastman Chemical; and combinations of two or more thereof.

In another particular embodiment, the plasticizer is selected from benzene mono-, di-, and tricarboxylic acid esters; phthalates, such as bis(2-ethylhexyl) phthalate (DEHP), diisononyl phthalate (DINP), di-n-butyl phthalate (DnBP, DBP), butyl benzyl phthalate (BBP), diisodecyl phthalate (DIDP), dioctyl phthalate (DnOP), diisooctyl phthalate (DIOP), diethyl phthalate (DEP), diisobutyl phthalate (DIBP), and di-n-hexyl phthalate; iso- and terephthalates, such as dioctyl terephthalate and dinonyl isophthalate; trimellitates, such as trimethyl trimellitate (TMTM), tri-(2-ethylhexyl) trimellitate (TOTM), tri-(n-octyl,n-decyl) trimellitate, tri-(heptyl,nonyl) trimellitate, tri-n-octyl trimellitate; and benzoates, such as 2-ethylhexyl-4-hydroxy benzoate, n-octyl benzoate, methyl benzoate, and ethyl benzoate; and combination of two or more thereof.

In another particular embodiment, the plasticizer is selected from alkyl diacid esters commonly based on C4-C12 alkyl dicarboxylic acids, such as adipic, sebacic, azelaic, and maleic acids, e.g., bis(2-ethylhexyl)adipate (DEHA), dimethyl adipate (DMAD), monomethyl adipate (MMAD), dioctyl adipate (DOA), dibutyl sebacate (DBS), dibutyl maleate (DBM), diisobutyl maleate (DIBM), dioctyl sebacate (DOS), esters based on glycols, polyglycols and polyhydric alcohols, such as poly(ethylene glycol), mono- and di-esters, cyclohexanedimethanol esters, sorbitol derivatives, and triethylene glycol dihexanoate, diethylene glycol di-2-ethylhexanoate, tetraethylene glycol diheptanoate, and ethylene glycol dioleate.

In another particular embodiment, the plasticizer is selected from fatty acids, fatty acid salts, fatty acid amides, and fatty acid esters, including, for example, compounds such as stearic, oleic, ricinoleic, behenic, myristic, linoleic, palmitic, and lauric acid esters, salts, and mono- and bis-amides. Suitable fatty acid salts include, for example, metal stearates, erucates, laurates, oleates, palmitates, pelargonates, and the like. Also suitable are fatty alcohols and acetylated fatty alcohols, and carbonate esters, such as propylene carbonate and ethylene carbonate. Particularly suitable are, for example, alkyl oleates selected from methyl, ethyl, propyl, butyl, octyl, and decyl oleates. In a particular aspect of this embodiment, the plasticizer is selected from ethyl oleate, butyl oleate, octyl oleat, and 2-ethyl hexyl oleate. Also particularly suitable are butyl stearate, methyl acetylricinoleate, zinc oleate, ethylene bis-oleamide, stearyl erucamide, zinc stearate, calcium stearate, magnesium stearate, barium stearate.

In another particular embodiment, the plasticizer is selected from glycerol-based esters, such as soy-bean, tung, or linseed oils, and their epoxidized derivatives; polymeric polyester plasticizers formed from the esterification reaction of diacids and diglycols; and the ring-opening polymerization reaction of caprolactones with diacids or diglycols. Citrate esters and acetylated citrate esters are particularly suitable. Glycerol mono-, di-, and tri-oleates are also particularly suitable.

In another particular embodiment, the plasticizer is selected from dicarboxylic acid molecules containing both a carboxylic acid ester and a carboxylic acid salt, such as the magnesium salt of mono-methyl adipate and the zinc salt of mono-octyl glutarate; tri- and tetra-carboxylic acid esters and salts.

In another particular embodiment, the plasticizer is selected from organophosphate and organosulfur compounds, such as tricresyl phosphate (TCP), tributyl phosphate (TBP), alkyl sulfonic acid phenyl esters (ASE); sulfonamides, such as N-ethyl toluene sulfonamide, N-(2-hydroxypropyl) benzene sulfonamide, N-(n-butyl) benzene sulfonamide; and thioester and thioether variants thereof.

In another particular embodiment, the plasticizer is selected from alcohols, glycols, polyglycols, and polyethers, such as polytetramethylene ether glycol, poly(ethylene glycol), and poly(propylene glycol), oleyl alcohol, and cetyl alcohol.

In another particular embodiment, the plasticizer is selected from saturated and unsaturated, linear and cyclic, halogenated and non-halogenated hydrocarbons, and particularly mineral oils, microcrystalline waxes, and low-molecular weight polybutadiene.

In another particular embodiment, the plasticizer is selected from butylbenzenesulphonamide (BBSA), ethylhexyl para-hydroxybenzoate (EHPB) and decylhexyl para-hydroxybenzoate (DHPB), as disclosed in U.S. Pat. No. 6,376,037 to Montanan et al., the entire disclosure of which is hereby incorporated herein by reference.

In another particular embodiment, the plasticizer is selected from esters and alkylamides, such as phthalic acid esters, including, for example, dimethyl phthalate, diethyl phthalate, dibutyl phthalate, diheptyl phthalate, di-2-ethylhexyl phthalate, di-n-octyl phthalate, diisodecyl phthalate, ditridecyl phthalate, dicyclohexyl phthalate, butylbenzyl phthalate, diisononyl phthalate, ethylphthalylethyl glycolate, butylphthalylbutyl glycolate, diundecyl phthalate, and di-2-ethylhexyl tetrahydrophthalate, and those disclosed in U.S. Pat. No. 6,538,099 to Isobe et al., the entire disclosure of which is hereby incorporated herein by reference.

In another particular embodiment, the plasticizer is selected from sulphonamides such as N-butylbenzenesulphonamide, ethyltoluene-suiphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, and oligoethyleneoxy malonate; esters of hydroxybenzoic acid; esters and ethers of tetrahydrofurfuryl alcohol, and esters of citric acid or hydroxymalonic acid; and those disclosed in U.S. Pat. No. 7,045,185 to Jacques et al, the entire disclosure of which is hereby incorporated herein by reference.

In another particular embodiment, the plasticizer is selected from sulfonamides, such as N-alkyl benzenesulfonamides and toluenesulfonamides, and particularly N-butyl-benzenesulfonamide, N-(2-hydroxypropyl)benzenesulfonamide, N-ethyl-o-toluenesulfonamide, N-ethyl-p-toluenesulfonamide, o-toluenesulfonamide, p-toluenesulfonamide, and the sulfonamides disclosed in U.S. Pat. No. 7,297,737 to Fish, Jr. et al., and U.S. Patent Application Publication No. 2010/0183837 to Hochstetter et al., the entire disclosures of which are hereby incorporated herein by reference.

In some embodiments, the low molecular weight acid-containing wax can be reacted with the high molecular weight organic acid or salt thereof and the cation source and plasticizer simultaneously. In other embodiments, the low molecular weight acid-containing wax can be reacted with the high molecular weight organic acid or salt thereof prior to the addition of the cation source and/or plastcizer.

Embodiments are envisioned wherein component (a) may be included in an amount of 5 to 95 parts of each 100 parts of components (a) and (b) combined; component (b) may be included in an amount of from about 5 to 95 parts of each 100 parts of components (a) and (b) combined; and component (c) may be included in an amount of from 5 to 100 parts per 100 parts of components (a) and (b) combined.

In a particular embodiment, component (a) is included in the mixture in an amount of about 70-80 wt % of each 100 wt % of components (a) and (b) combined, component (b) is included in the mixture in an amount of about 20-30 wt % of each 100 wt % of components (a) and (b) combined, and component (c) is included in the mixture in an amount of about 35-45 wt % per 100 wt % of components (a) and (b) combined.

In an alternative embodiment, component (a) is included in the mixture in an amount of about 60-80 wt % of each 100 wt % of components (a) and (b) combined, component (b) is included in the mixture in an amount of about 20-40 wt % of each 100 wt % of components (a) and (b) combined, and component (c) is included in the mixture in an amount of about 30-50 wt % per 100 wt % of components (a) and (b) combined.

In another embodiment, component (a) is included in the mixture in an amount of about 40-80 wt % of each 100 wt % of components (a) and (b) combined, component (b) is included in the mixture in an amount of about 40-80 wt % of each 100 wt % of components (a) and (b) combined, and component (c) is included in the mixture in an amount of about 40-80 wt % per 100 wt % of components (a) and (b) combined.

In a different embodiment, component (a) is included in the mixture in an amount of about 20-30 wt % of each 100 wt % of components (a) and (b) combined, component (b) is included in the mixture in an amount of about 70-80 wt % of each 100 wt % of components (a) and (b) combined, and component (c) is included in the mixture in an amount of about 35-75 wt % per 100 wt % of components (a) and (b) combined.

In a further embodiment, component (a) is included in the mixture in an amount of about 20-40 wt % of each 100 wt % of components (a) and (b) combined, component (b) is included in the mixture in an amount of about 60-80 wt % of each 100 wt % of components (a) and (b) combined, and component (c) is included in the mixture in an amount of about 30-80 wt % per 100 wt % of components (a) and (b) combined.

In particular embodiments, the low molecular weight acid-containing wax(es) is/are high melt index ("MI")/low viscosity. By the term, "high melt index," it is meant a relatively low melt viscosity composition having a melt index value of greater than or equal to 5.0 g/10 min, and more preferably at least 10 g/10 min (ASTM D1238, condition E at 190° C.). By the term, "low melt index," it is meant a relatively high melt viscosity composition having a melt index of less than 5.0 g/10 min. The present invention contemplates the use of low molecular weight acid-containing waxes having a Brookfield viscosity of less than about 1,000 cps or about 1100 cps or less, and a density of less than 0.96 g/cc. Examples of high MI/low viscosity waxes include, but are not limited to one or more of A-C® 5180, and/or A-C® 540, and/or A-C® 580, and/or A-C® 5135, and/or A-C®5150, commercially available from Honeywell International Inc.

The component (d) plasticizer is preferably present in the plasticized neutralized acid polymer composition in an amount sufficient to substantially change the stiffness and/or hardness of the acid copolymer. In one such embodiment, the plasticizer is present in an amount of 0.5% or 1% or 3% or 5% or 7% or 8% or 9% or 10% or 12% or 15% or 18% or 20% or 22% or 25% or 30% or 35% or 40% or 42% or 50% or 55% or 60% or 66% or 71% or 75% or 80%, by weight based on the total weight of components (a) and (b) and (d) combined. In a different embodiment, the plasticizer is present in an amount of 0.5% or 1% or 3% or 5% or 7% or 8% or 9% or 10% or 12% or 15% or 18% or 20% or 22% or 25% or 30% or 35% or 40% or 42% or 50% or 55% or 60% or 66% or 71% or 75% or 80%, by weight based on the total weight of the plasticized neutralized acid polymer composition, or the plasticizer may be present in an amount within a range having a lower limit and an upper limit selected from these values.

Component (d) may also be included in an amount of from about 1.0 parts to about 300 parts per 100 parts of components (a) and (b) combined. In one embodiment, component (d) may be included in an amount of from about 1.0 parts to about 250 parts per 100 parts of components (a) and (b) combined. In another embodiment, component (d) may be included in an amount of from about 1.0 parts to about 200 parts per 100 parts of components (a) and (b) combined. In yet another embodiment, component (d) may be included in an amount of from about 1.0 parts to about 150 parts per 100 parts of components (a) and (b) combined. In still another embodiment, component (d) may be included in an amount of from about 1.0 parts to about 100 parts per 100 parts of components (a) and (b) combined. In an alternative embodiment, component (d) may be included in an amount of from about 1.0 parts to about 50 parts per 100 parts of components (a) and (b) combined. In a different embodiment, component (d) may be included in an amount of from about 50 parts to about 150 parts per 100 parts of components (a) and (b) combined. In other embodiments, component (d) may be included in amounts of from about 25 parts to about 175 parts per 100 parts, or from about 10 parts to about 100 parts per 100 parts, or from about 100 parts to about 300 parts per 100 parts, or from about 100 parts to about 200 parts per 100 parts, or from about 25 parts to about 75 parts per 100 parts, or from about 200 parts to about 300 parts per 100 parts, or from about 250 parts to about 300 parts per 100 parts, or from about 1.0 parts to about 25 parts per 100 parts, or from about 275 parts to about 300 parts per 100 parts, of components (a) and (b) combined.

Component (d) may also or alternatively be included in the mixture in an amount of about 0.5-80 wt % of each 100 wt % of components (a) and (b) and (d) combined. In one embodiment, component (d) may be included in the mixture in an amount of about 0.5-55 wt % of each 100 wt % of components (a) and (b) and (d) combined. In another embodiment, component (d) may be included in the mixture in an amount of about 0.5-35 wt % of each 100 wt % of components (a) and (b) and (d) combined. In yet another embodiment, component (d) may be included in the mixture in an amount of about 10-75 wt % of each 100 wt % of components (a) and (b) and (d) combined. In still another embodiment, component (d) may be included in the mixture in an amount of about 20-70 wt % of each 100 wt % of components (a) and (b) and (d) combined. In an alternative embodiment, component (d) may be included in the mixture in an amount of about 30-75 wt % of each 100 wt % of components (a) and (b) and (d) combined. In a different embodiments, component (d) may be included in the mixture in an amount of about 35-80 wt % of each 100 wt % of components (a) and (b) and (d) combined, or in an amount of about 40-80 wt % of each 100 wt % of components (a) and (b) and (d) combined, or in an amount of about 60-80 wt % of each 100 wt % of components (a) and (b) and (d) combined.

The mixture may have a melt flow index of at least 0.5 g/10 min., or from 0.5 g/10 min to 10 g/10 min, or from 1.0 g/10 min to 5 g/10 min, or from about 0.5 g/10 min to about 4.0 g/10 min.

The golf ball may have a CoR of from about 0.740 to about 0.840. The golf ball may also have a compression of from about 40 to about 135.

In a specific non-limiting example, the mixture may include 73.3 wt % of A-C®5120 (of each 100% of A-C®5120 and Elvaloy®34035 combined), 26.7 wt % of Elvaloy®34035 (of each 100% of A-C®5120 and Elvaloy®34035 combined), and 41.6 wt % of oleic acid magnesium salt (per 100% of A-C®5120 and Elvaloy®34035 combined), as set forth in example 67 of TABLE 3 herein, along with a sufficient amount of plasticizer such as disclosed herein.

Other non-limiting examples of components (a), (b) and (c) of a plasticized neutralized acid polymer composition are set forth in Examples 66 and 80 of TABLE 3 as follows:

TABLE 3

| Example | Component 1 | wt % | Component 2 | wt % | Component 3 | wt % |
|---|---|---|---|---|---|---|
| 1 | Primacor 5980I | 78 | Lotader 4603 | 22 | magnesium oleate | 41.6 |
| 2 | Primacor 5980I | 84 | Elvaloy AC 1335 | 16 | magnesium oleate | 41.6 |
| 3 | Primacor 5980I | 78 | Elvaloy AC 3427 | 22 | magnesium oleate | 41.6 |
| 4 | Primacor 5980I | 78 | Elvaloy AC 1335 | 22 | magnesium oleate | 41.6 |
| 5 | Primacor 5980I | 78 | Elvaloy AC 1224 | 22 | magnesium oleate | 41.6 |
| 6 | Primacor 5980I | 78 | Lotader 4720 | 22 | magnesium oleate | 41.6 |
| 7 | Primacor 5980I | 85 | Vamac G | 15 | magnesium oleate | 41.6 |
| 8 | Primacor 5980I | 90 | Vamac G | 10 | magnesium oleate | 41.6 |
| 8.1 | Primacor 5990I | 90 | Fusabond 614 | 10 | magnesium oleate | 41.6 |
| 9 | Primacor 5980I | 78 | Vamac G | 22 | magnesium oleate | 41.6 |
| 10 | Primacor 5980I | 75 | Lotader 4720 | 25 | magnesium oleate | 41.6 |
| 11 | Primacor 5980I | 55 | Elvaloy AC 3427 | 45 | magnesium oleate | 41.6 |
| 12 | Primacor 5980I | 55 | Elvaloy AC 1335 | 45 | magnesium oleate | 41.6 |
| 12.1 | Primacor 5980I | 55 | Elvaloy AC 34035 | 45 | magnesium oleate | 41.6 |
| 13 | Primacor 5980I | 55 | Elvaloy AC 2116 | 45 | magnesium oleate | 41.6 |

TABLE 3-continued

| Example | Component 1 | wt % | Component 2 | wt % | Component 3 | wt % |
|---|---|---|---|---|---|---|
| 14 | Primacor 5980I | 78 | Elvaloy AC 34035 | 22 | magnesium oleate | 41.6 |
| 14.1 | Primacor 5990I | 80 | Elvaloy AC 34035 | 20 | magnesium oleate | 41.6 |
| 15 | Primacor 5980I | 34 | Elvaloy AC 34035 | 66 | magnesium oleate | 41.6 |
| 16 | Primacor 5980I | 58 | Vamac G | 42 | magnesium oleate | 41.6 |
| 17 | Primacor 5990I | 80 | Fusabond 416 | 20 | magnesium oleate | 41.6 |
| 18 | Primacor 5980I | 100 | — | — | magnesium oleate | 41.6 |
| 19 | Primacor 5980I | 78 | Fusabond 416 | 22 | magnesium oleate | 41.6 |
| 20 | Primacor 5990I | 100 | — | — | magnesium oleate | 41.6 |
| 21 | Primacor 5990I | 20 | Fusabond 416 | 80 | magnesium oleate | 41.6 |
| 21.1 | Primacor 5990I | 20 | Fusabond 416 | 80 | magnesium oleate | 31.2 |
| 21.2 | Primacor 5990I | 20 | Fusabond 416 | 80 | magnesium oleate | 20.8 |
| 22 | Clarix 011370 | 30.7 | Fusabond 416 | 69.3 | magnesium oleate | 41.6 |
| 23 | Primacor 5990I | 20 | Royaltuf 498 | 80 | magnesium oleate | 41.6 |
| 24 | Primacor 5990I | 80 | Royaltuf 498 | 20 | magnesium oleate | 41.6 |
| 25 | Primacor 5990I | 80 | Kraton FG1924GT | 20 | magnesium oleate | 41.6 |
| 26 | Primacor 5990I | 20 | Kraton FG1924GT | 80 | magnesium oleate | 41.6 |
| 27 | Nucrel 30707 | 57 | Fusabond 416 | 43 | magnesium oleate | 41.6 |
| 28 | Primacor 5990I | 80 | Hytrel 3078 | 20 | magnesium oleate | 41.6 |
| 29 | Primacor 5990I | 20 | Hytrel 3078 | 80 | magnesium oleate | 41.6 |
| 30 | Primacor 5980I | 26.8 | Elvaloy AC 34035 | 73.2 | magnesium oleate | 41.6 |
| 31 | Primacor 5980I | 26.8 | Lotader 4603 | 73.2 | magnesium oleate | 41.6 |
| 32 | Primacor 5980I | 26.8 | Elvaloy AC 2116 | 73.2 | magnesium oleate | 41.6 |
| 33 | Escor AT-320 Primacor 5980I | 30 18 | Elvaloy AC 34035 | 52 | magnesium oleate | 41.6 |
| 34 | Nucrel 30707 | 78.5 | Elvaloy AC 34035 | 21.5 | magnesium oleate | 41.6 |
| 35 | Nucrel 30707 | 78.5 | Fusabond 416 | 21.5 | magnesium oleate | 41.6 |
| 36 | Primacor 5980I | 26.8 | Fusabond 416 | 73.2 | magnesium oleate | 41.6 |
| 37 | Primacor 5980I | 19.5 | Fusabond N525 | 80.5 | magnesium oleate | 41.6 |
| 38 | Clarix 011536-01 | 26.5 | Fusabond N525 | 73.5 | magnesium oleate | 41.6 |
| 39 | Clarix 011370-01 | 31 | Fusabond N525 | 69 | magnesium oleate | 41.6 |
| 39.1 | XUS 60758.08L | 29.5 | Fusabond N525 | 70.5 | magnesium oleate | 41.6 |
| 40 | Nucrel 31001 | 42.5 | Fusabond N525 | 57.5 | magnesium oleate | 41.6 |
| 41 | Nucrel 30707 | 57.5 | Fusabond N525 | 42.5 | magnesium oleate | 41.6 |
| 42 | Escor AT-320 | 66.5 | Fusabond N525 | 33.5 | magnesium oleate | 41.6 |
| 43 | Nucrel 2906/2940 | 21 | Fusabond N525 | 79 | magnesium oleate | 41.6 |
| 44 | Nucrel 960 | 26.5 | Fusabond N525 | 73.5 | magnesium oleate | 41.6 |
| 45 | Nucrel 1214 | 33 | Fusabond N525 | 67 | magnesium oleate | 41.6 |
| 46 | Nucrel 599 | 40 | Fusabond N525 | 60 | magnesium oleate | 41.6 |
| 47 | Nucrel 9-1 | 44.5 | Fusabond N525 | 55.5 | magnesium oleate | 41.6 |
| 48 | Nucrel 0609 | 67 | Fusabond N525 | 33 | magnesium oleate | 41.6 |
| 49 | Nucrel 0407 | 100 | — | — | magnesium oleate | 41.6 |
| 50 | Primacor 5980I | 90 | Fusabond N525 | 10 | magnesium oleate | 41.6 |
| 51 | Primacor 5980I | 80 | Fusabond N525 | 20 | magnesium oleate | 41.6 |
| 52 | Primacor 5980I | 70 | Fusabond N525 | 30 | magnesium oleate | 41.6 |
| 53 | Primacor 5980I | 60 | Fusabond N525 | 40 | magnesium oleate | 41.6 |
| 54 | Primacor 5980I | 50 | Fusabond N525 | 50 | magnesium oleate | 41.6 |
| 55 | Primacor 5980I | 40 | Fusabond N525 | 60 | magnesium oleate | 41.6 |
| 56 | Primacor 5980I | 30 | Fusabond N525 | 70 | magnesium oleate | 41.6 |
| 57 | Primacor 5980I | 20 | Fusabond N525 | 80 | magnesium oleate | 41.6 |
| 58 | Primacor 5980I | 10 | Fusabond N525 | 90 | magnesium oleate | 41.6 |
| 59 | — | — | Fusabond N525 | 100 | magnesium oleate | 41.6 |
| 60 | Nucrel 0609 Nucrel 0407 | 40 40 | Fusabond N525 | 20 | magnesium oleate | 41.6 |
| 61 | Nucrel AE | 100 | — | — | magnesium oleate | 41.6 |
| 62 | Primacor 5980I | 30 | Fusabond N525 | 70 | CA1700 soya fatty acid magnesium salt | 41.6 |
| 63 | Primacor 5980I | 30 | Fusabond N525 | 70 | CA1726 linoleic acid magnesium salt | 41.6 |
| 64 | Primacor 5980I | 30 | Fusabond N525 | 70 | CA1725 conjugated linoleic acid magnesium salt | 41.6 |
| 65 | Primacor 5980I | 30 | Fusabond N525 | 70 | Century 1107 isostearic acid magnesium salt | 41.6 |
| 66 | A-C 5120 | 73.3 | Lotader 4700 | 26.7 | oleic acid magnesium salt | 41.6 |
| 67 | A-C 5120 | 73.3 | Elvaloy 34035 | 26.7 | oleic acid magnesium salt | 41.6 |
| 68 | Primacor 5980I | 78.3 | Lotader 4700 | 21.7 | oleic acid magnesium salt and sodium salt | 41.6 |

TABLE 3-continued

| Example | Component 1 | wt % | Component 2 | wt % | Component 3 | wt % |
|---|---|---|---|---|---|---|
| 69 | Primacor 5980I<br>A-C 5180 | 47<br>40 | Elvaloy AC34035 | 13 | — | — |
| 70 | Primacor 5980I | 30 | Fusabond N525 | 70 | Sylfat FA2 magnesium salt | 41.6 |
| 71 | Primacor 5980I | 30 | Fusabond N525 | 70 | oleic acid magnesium salt<br>ethyl oleate | 31.2<br>10 |
| 72 | Primacor 5980I | 80 | Fusabond N525 | 20 | sebacic acid magnesium salt | 41.6 |
| 73 | Primacor 5980I<br>A-C 5180 | 60<br>40 | — | — | — | — |
| 74 | Primacor 5980I<br>A-C 575 | 78.3<br>21.7 | — | — | oleic acid magnesium salt | 41.6 |
| 75 | Primacor 5980I | 78.3 | Exxelor VA 1803 | 21.7 | oleic acid magnesium salt | 41.6 |
| 76 | Primacor 5980I | 78.3 | A-C 395 | 21.7 | oleic acid magnesium salt | 41.6 |
| 77 | Primacor 5980I | 78.3 | Fusabond C190 | 21.7 | oleic acid magnesium salt | 41.6 |
| 78 | Primacor 5980I | 30 | Kraton FG 1901 | 70 | oleic acid magnesium salt | 41.6 |
| 79 | Primacor 5980I | 30 | Royaltuf 498 | 70 | oleic acid magnesium salt | 41.6 |
| 80 | A-C 5120 | 40 | Fusabond N525 | 60 | oleic acid magnesium salt | 41.6 |
| 81 | Primacor 5980I | 30 | Fusabond N525 | 70 | erucic acid magnesium salt | 41.6 |
| 82 | Primacor 5980I | 30 | CB23 | 70 | oleic acid magnesium salt | 41.6 |
| 83 | Primacor 5980I | 30 | Nordel IP 4770 | 70 | oleic acid magnesium salt | 41.6 |
| 84 | Primacor 5980I<br>A-C 5180 | 48<br>32 | Fusabond N525 | 20 | oleic acid magnesium salt | 41.6 |
| 85 | Nucrel 2806 | 22.2 | Fusabond N525 | 77.8 | oleic acid magnesium salt | 41.6 |
| 86 | Primacor 3330 | 61.5 | Fusabond N525 | 38.5 | oleic acid magnesium salt | 41.6 |
| 87 | Primacor 3330<br>Primacor 3150 | 45.5<br>34.5 | Fusabond N525 | 20 | oleic acid magnesium salt | 41.6 |
| 88 | Primacor 3330<br>Primacor 3150 | 28.5<br>71.5 | — | — | oleic acid magnesium salt | 41.6 |
| 89 | Primacor 3150 | 67 | Fusabond N525 | 33 | oleic acid magnesium salt | 41.6 |
| 90 | Primacor 5980I | 55 | Elvaloy AC 34035 | 45 | oleic acid magnesium salt<br>ethyl oleate | 31.2<br>10 |

The ingredients of TABLE 3 are identifiable as follows. A-C® 5120 ethylene acrylic acid copolymer with an acrylic acid content of 15% (low molecular weight acid-containing wax), A-C® 5180 ethylene acrylic acid copolymer with an acrylic acid content of 20% (low molecular weight acid-containing wax), A-C® 395 high density oxidized polyethylene homopolymer, and A-C® 575 ethylene maleic anhydride copolymer, are commercially available from Honeywell; CB23 high-cis neodymium-catalyzed polybutadiene rubber, is commercially available from Lanxess Corporation; CA1700 Soya fatty acid, CA1726 linoleic acid, and CA1725 conjugated linoleic acid, are commercially available from Chemical Associates; Century® 1107 highly purified isostearic acid mixture of branched and straight-chain C18 fatty acid, is commercially available from Arizona Chemical; Clarix® 011370-01 ethylene acrylic acid copolymer with an acrylic acid content of 13% and Clarix® 011536-01 ethylene acrylic acid copolymer with an acrylic acid content of 15%, are commercially available from A. Schulman Inc.; Elvaloy® AC 1224 ethylene-methyl acrylate copolymer with a methyl acrylate content of 24 wt %, Elvaloy® AC 1335 ethylene-methyl acrylate copolymer with a methyl acrylate content of 35 wt %, Elvaloy® AC 2116 ethylene-ethyl acrylate copolymer with an ethyl acrylate content of 16 wt %, Elvaloy® AC 3427 ethylene-butyl acrylate copolymer having a butyl acrylate content of 27 wt %, and Elvaloy® AC 34035 ethylene-butyl acrylate copolymer having a butyl acrylate content of 35 wt %, are commercially available from E. I. du Pont de Nemours and Company; Escor® AT-320 ethylene acid terpolymer, is commercially available from ExxonMobil Chemical Company; Exxelor® VA 1803 amorphous ethylene copolymer functionalized with maleic anhydride, is commercially available from ExxonMobil Chemical Company; Fusabond® N525 metallocene-catalyzed polyethylene, Fusabond® N416 chemically modified ethylene elastomer, Fusabond® C190 anhydride modified ethylene vinyl acetate copolymer, and Fusabond® P614 functionalized polypropylene, are commercially available from E. I. du Pont de Nemours and Company; Hytrel® 3078 very low modulus thermoplastic polyester elastomer, is commercially available from E. I. du Pont de Nemours and Company; Kraton® FG 1901 GT linear triblock copolymer based on styrene and ethylene/butylene with a polystyrene content of 30% and Kraton® FG1924GT linear triblock copolymer based on styrene and ethylene/butylene with a polystyrene content of 13%, are commercially available from Kraton Performance Polymers Inc.; Lotader® 4603, 4700 and 4720, random copolymers of ethylene, acrylic ester and maleic anhydride, are commercially available from Arkema Corporation; Nordel® IP 4770 high molecular weight semi-crystalline EPDM rubber, is commercially available from The Dow Chemical Company; Nucrel® 9-1, Nucrel® 599, Nucrel® 960, Nucrel® 0407, Nucrel® 0609, Nucrel® 1214, Nucrel® 2906, Nucrel® 2940, Nucrel® 30707, Nucrel® 31001, and Nucrel® AE acid copolymers, are commercially available from E. I. du Pont de Nemours and Company; Primacor® 3150, 3330, 59801, and 59901 acid copolymers, are commercially available from The Dow Chemical Company; Royaltuf® 498 maleic anhydride modified polyolefin based on an amorphous EPDM, is commercially available from Chemtura Corporation; Sylfat® FA2 tall oil fatty acid, is commercially available from Arizona Chemical; Vamac® G terpolymer of ethylene, methyl acrylate and a cure site monomer, is commercially available from E. I. du Pont de Nemours and Company; and XUS 60758.08L ethylene acrylic acid copolymer with an acrylic acid content of 13.5%, is commercially available from The Dow Chemical Company.

The at least one layer of a golf ball of the invention may in some embodiments comprise the plasticized neutralized acid polymer composition as well as additives, fillers and combinations thereof.

In a different embodiment, a golf ball of the invention comprises at least one layer consisting of the plasticized neutralized acid polymer composition consisting of a mixture of: (a) at least one low molecular weight acid-containing wax; (b) at least one non-acid-polymer, of which at least one is a low molecular weight non-acid wax; (c) at least one organic acid or salt thereof; and (d) at least one plasticizer; wherein each low molecular weight acid-containing wax has a molecular weight of from about 500 to about 30,000; wherein the mixture may contain at least 70 percent of neutralized acid groups; and wherein the mixture has a melt flow index of at least 0.5 g/10 min.

Generally, components (a), (b), (c) and (d) of the mixture may be fed simultaneously or individually into a melt extruder, such as a single or twin screw extruder. Neutralization occurs in the melt or molten state in the mixer or extruder. The components are then blended in the mixer or the extruder prior to being extruded as a strand from the die-head.

Neutralization occurs by reacting the low molecular weight acid-containing polymer(s) with a sufficient amount of cation source, in the presence of an organic acid or salt thereof, such that the desired percent of all acid groups present are neutralized. The low molecular weight acid-containing polymer(s) may also be at least partially neutralized prior to the above process.

In one embodiment, the low molecular weight acid-containing polymer(s) is/are reacted with the organic acid or salt thereof and the cation source simultaneously. In another embodiment, the low molecular weight acid-containing polymer(s) is/are reacted with the organic acid or salt thereof prior to the addition of the cation source and/or plasticizer. For example, the low molecular weight acid-containing polymer(s) may be melt-blended with an organic acid or a salt of the organic acid, and a sufficient amount of a cation source may be added to increase the level of neutralization of all the acid moieties (including those in the low molecular weight acid-containing polymer(s) and in the organic acid) to at least about 70 percent or as otherwise targeted. However, any method of neutralization available to those of ordinary skill in the art may also be suitably employed. After the plasticized neutralized acid polymer composition is prepared, the composition is formed into pellets and maintained in such a state until molding is desired.

In some embodiments, the plasticized neutralized acid polymer composition may be prepared through letdowns of a pre-mixture of components (a) and (b). The pre-mixture of components (a) and (b) may be blended with components (c) and (d) in a mixer or an extruder, for example. Once again, neutralization will occur in the melt or molten state in the mixer or extruder. The resulting mixture preferably contains at least 70 percent of neutralized acid groups, and in some embodiments even more preferably contains greater than 70, or greater than 80, or greater than 90 or 100 percent of neutralized acid groups, or as otherwise disclosed herein.

In some embodiments, additives and/or fillers, may be added and uniformly mixed or otherwise combined with the neutralized acid polymer composition before initiation of the molding process. Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof.

The plasticized neutralized acid polymer composition is then injected into a golf ball mold to form the at least one golf ball layer. The golf ball layer may include a core layer, an intermediate layer, a cover layer, coating layer, a tie layer, or combinations thereof.

Golf balls of the invention may be formed using a variety of application techniques. For example, golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials.

In one embodiment, the golf ball layers may be formed using injection molding. When injection molding is used, the plasticized neutralized acid polymer composition is typically in a pelletized or granulated form that can be easily fed into the throat of an injection molding machine wherein it is melted and conveyed via a screw in a heated barrel at temperatures of from 150° F. to 600° F., preferably from 200° F. to 500° F. The molten composition is ultimately injected into a closed mold cavity, which may be cooled, at ambient or at an elevated temperature, but typically the mold is cooled to a temperature of from 50° F. to 70° F. After residing in the closed mold for a time of from 1 second to 300 seconds, preferably from 20 seconds to 120 seconds, the core and/or core plus one or more additional core or cover layers is removed from the mold and either allowed to cool at ambient or reduced temperatures or is placed in a cooling fluid such as water, ice water, dry ice in a solvent, or the like.

It was previously believed that low molecular weight ionomer waxes could only be used as additives to improve melt flow, and even then, in maximum amounts of 20-30% of a blend with high molecular weight acid polymers. Unfortunately, acid and ester levels were limited by available high molecular weight ionomer resins. Thus, golf balls of the invention advantageously widen the range of the very and highly neutralized polymer compositions which may be produced over such prior predominantly high molecular weight acid-containing blends, and achieve higher than expected CoR and compression, by incorporating plasticized high melt flow ionomers in the form of low molecular weight waxes in the mixtures described and claimed herein without using any high molecular weight acid-containing polymers. Mixing low molecular weight E/X waxes, such as the A-C and AClyn waxes from Honeywell with E/Y polymers, such as Lotader and Elvaloy, when very or fully neutralized with a metal cation, achieve such higher than expected CoR and compression. In this regard, the ester-containing very or highly neutralized polymers do not require the ester to reside on the same chain as the acid group, such that the E/X, E/Y blends are possible. Herein, E is an olefin (e.g., ethylene), X is a carboxylic acid such as acrylic, methacrylic, crotonic, maleic, fumaric, or itaconic acid, and Y is a softening comonomer such as vinyl esters of aliphatic carboxylic acids wherein the acid has from 2 to 10 carbons, alkyl ethers wherein the alkyl group has from 1 to 10 carbons, and alkyl acrylates such as alkyl methyl acrylates wherein the alkyl group has from 1 to 10 carbons; and blends of two or more thereof. Furthermore, for purposes of this invention, acid polymers have acid groups that are non-grafted. In particular, maleic anhydride modified polymers are defined herein as a non-acid polymer despite having anhydride groups that can ring-open to the acid form during processing of the polymer to form the plasticized neutralized acid polymer composition herein. The maleic anhydride groups are grafted onto a polymer, are present at relatively very low levels, and are not part of the polymer backbone, as is the case with the acid copolymers.

Accordingly, conventional predominantly high molecular weight acid-containing ionomers and/or their corresponding base resins are not necessary or required to achieve desired golf ball properties.

The cores of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded.

The intermediate layer and/or cover layer may also be formed using any suitable method known to those of ordinary skill in the art. For example, an intermediate layer may be formed by blow molding and covered with a dimpled cover layer formed by injection molding, compression molding, casting, vacuum forming, powder coating, and the like.

As discussed briefly above, the plasticized neutralized acid polymer composition of the present invention may be used with any type of ball construction including, but not limited to, one-piece, two-piece, three-piece, and four or more piece designs, a double core, a double cover, an intermediate layer(s), a multilayer core, and/or a multi-layer cover depending on the type of performance desired of the ball. That is, the plasticized neutralized acid polymer compositions of the invention may be used in a core, an intermediate layer, and/or a cover of a golf ball, each of which may have a single layer or multiple layers. In one embodiment, the plasticized neutralized acid polymer compositions of the invention are formed into a core layer. In another embodiment, the plasticized neutralized acid polymer compositions of the invention are formed into an intermediate layer. In yet another embodiment, the plasticized neutralized acid polymer compositions of the invention are formed into a cover layer.

The core or core layer(s) may be formed from the plasticized neutralized acid polymer compositions of the invention. For example, a core formed from the plasticized neutralized acid polymer composition of the invention may be covered with a castable thermoset or injection moldable thermoplastic material or any of the other cover materials discussed below. The core may have a diameter of about 0.5 inches to about 1.64 inches and the cover layer thickness may range from about 0.03 inches to about 0.12 inches.

When not formed from the plasticized neutralized acid polymer compositions of the invention, any core material known to one of ordinary skill in that art is suitable for use in the golf balls of the invention. In particular, the core may be solid, semi-solid, hollow, fluid-filled or powder-filled, one-piece or multi-component cores. As used herein, the term "fluid" includes a liquid, a paste, a gel, a gas, or any combination thereof; the term "fluid-filled" includes hollow centers or cores; and the term "semi-solid" refers to a paste, a gel, or the like. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. In addition, the compositions of the invention may be incorporated into the core.

An intermediate layer, such as an outer core layer or inner cover layer, i.e., any layer(s) disposed between the inner core and the outer cover of a golf ball may be formed from the plasticized neutralized acid polymer compositions of the present invention. An intermediate layer may be used, if desired, with a multilayer cover or a multilayer core, or with both a multilayer cover and a multilayer core. As with the core, the intermediate layer may also include a plurality of layers.

In one embodiment, the intermediate layer is formed, at least in part from the plasticized neutralized acid polymer compositions of the invention. For example, an intermediate layer or inner cover layer having a thickness of about 0.015 inches to about 0.06 inches may be disposed about a core. In this aspect of the invention, the core, which has a diameter ranging from about 1.5 inches to about 1.59 inches, may also be formed from a plasticized neutralized acid polymer compositions of the invention or, in the alternative, from a conventional rubber composition. The inner ball may be covered by a castable thermoset or injection moldable thermoplastic material or any of the other cover materials discussed below. In this aspect of the invention, the cover may have a thickness of about 0.02 inches to about 0.045 inches, preferably about 0.025 inches to about 0.04 inches.

In another embodiment, the intermediate layer is covered by an inner cover layer, either of which may independently be formed from the plasticized neutralized acid polymer compositions of the invention or other material that produces the desired performance results. The center may be formed from plasticized neutralized acid polymer compositions of the invention or any of the other core materials previously discussed. The core may be covered by an outer core layer to form a core, which also may be formed form the plasticized neutralized acid polymer compositions of the invention, any of the core materials discussed above, or castable thermoset materials or injection moldable thermoplastic materials. The outer core layer may have a thickness of about 0.125 inches to about 0.500 inches. The core may then be covered with a casing layer having a thickness of about 0.015 inches to about 0.06 inches formed from a composition of the invention, a castable thermoset material or an injection moldable thermoplastic material. The outer cover layer, which preferably has a thickness of about 0.02 inches to about 0.045 inches, may be formed from a castable thermoset material or an injection moldable thermoplastic material or other suitable cover materials discussed below and known in the art.

When not formed from the plasticized neutralized acid polymer composition of the invention, the intermediate layer(s) may also be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly(ether-amide), polyphenylene oxide resins or blends thereof, and thermoplastic polyesters.

The cover provides the interface between the ball and a club. Properties that are desirable for the cover are good moldability, high moisture resistance, high abrasion resistance, high impact resistance, high tear strength, high resilience, and good mold release, among others. The cover layer may be formed, at least in part, from plasticized neutralized acid polymer compositions of the invention. However, when not formed from the compositions of the invention, the cover may be formed from one or more homopolymeric or copolymeric materials as discussed in the section above pertaining to the intermediate layer. Golf balls according to the invention may also be formed having a cover of polyurethane, polyurea, and polybutadiene materials for example.

It is envisioned that in some embodiments, a golf ball of the invention may incorporate two or greater different layers of differing plasticized neutralized acid polymer compositions. In this regard, two given plasticized neutralized acid polymer compositions may differ with respect type or relative amount of plasticizer (d) and/or with respect to at least one of components (a) (the at least one low molecular weight acid-containing wax); (b) (the at least one non-acid polymer); and (c) (the at least one organic acid or salt thereof); and/or the percent of acid groups that are neutralized. In some such embodiments, these two differing layers may be adjacent. In other embodiments, the two layers may have at least one layer disposed there between. In an embodiment wherein at least one layer is disposed there between, each of those layers disposed there between may be ionomeric layers that differ from the first layer and second layer. Alternatively, one or more of those layers disposed there between may be non-ionomeric such as a rubber composition or a thermoset or thermoplastic polyurethane or other conventional material.

Accordingly, differing plasticized neutralized acid polymer compositions may be preselected and coordinated in golf ball constructions of the invention to target desirable playing characteristics.

It is also understood that two given layers of a golf ball of the invention may incorporate the same plasticized neutralized acid polymer composition and yet differ due to the different type and/or amount of additives, fillers, etc. combined with each plasticized neutralized acid polymer composition prior to extrusion, etc.

Meanwhile, a given plasticized neutralized acid polymer composition will be softer and have a lower modulus than a neutralized acid polymer composition that does not contain component (d) but is otherwise identical in formulation—that is, with respect to mixture components (a), (b), (c), and percent of acid groups that are neutralized. Such a neutralized acid polymer composition shall be referred to herein as a "non-plasticized neutralized acid polymer composition".

In this regard, embodiments are envisioned wherein at least one layer of a golf ball of the invention incorporates a plasticized neutralized acid polymer composition, while at least one other layer incorporates a non-plasticized neutralized acid polymer composition. These layers may be strategically preselected and coordinated in golf ball constructions of a golf ball of the invention in order to target a wide range of desirable playing characteristics.

In one particular embodiment, a non-plasticized neutralized acid polymer composition has a first flexural modulus value, a plasticized neutralized acid polymer composition has a second flexural modulus value, wherein the second flexural modulus value is at least 1% less; or at least 2% less; or at least 4% less; or at least 8% less; or at least 10% less than the first flexural modulus value. In a particular aspect of this embodiment, the plasticized neutralized acid polymer composition has a flexural modulus of about 500 psi (or less), or a flexural modulus of 1,000 psi or 1,600 psi or 2,000 psi or 4,200 psi or 7,500 psi or 9,000 psi or 10,000 psi or 20,000 psi or 40,000 psi or 50,000 psi or 60,000 psi or 70,000 psi or 80,000 psi or 90,000 psi or 100,000 psi or 110,000 psi or 120,000 psi or 130,000 psi or 140,000 psi or 160,000 psi or 180,000 psi or 200,000 psi or 300,000 psi, or a flexural modulus within a range having a lower limit and an upper limit selected from these values.

In another particular embodiment, a non-plasticized neutralized acid polymer composition has a first Tg value, a plasticized neutralized acid polymer composition has a second Tg value, wherein the second Tg value is at least 1° less, or at least 2° less, or at least 4° less, or at least 8° less, or at least 10° less than the first Tg value, or the second Tg value is within 1° of the first Tg value.

In another particular embodiment, a non-plasticized neutralized acid polymer composition has a first compression, a plasticized neutralized acid polymer composition has a second compression, wherein the second compression is equal to or less than the first compression.

Embodiments are also envisioned wherein a golf ball of the invention incorporates a layer of plasticized neutralized acid polymer composition and a different layer that incorporates conventional golf ball materials such as rubber, thermoset or thermoplastic polyurethanes, or ionomers/HNPs (highly neutralized polymers)/VNPs (very neutralized polymers) in order to target and achieve a wide range of playing characteristics.

Any or all of these possibilities may be implemented within and/or between cores, intermediate layers, cover layers, and even coating layers of golf balls of the invention.

In particular embodiments, the plasticized neutralized acid polymer composition may have a Shore D hardness of 5 or 8 or 10 or 12 or 14 or 28 or 30 or 32 or 34 or 35 or 38 or 40, or a Shore D hardness within a range having a lower limit and an upper limit of these values.

In another particular embodiment, the plasticized neutralized acid polymer composition may have a Shore C hardness of 10 or 13 or 15 or 17 or 19 or 44 or 46 or 48 or 50 or 53 or 55, or a Shore C hardness within a range having a lower limit and an upper limit of these values.

In another particular embodiment, the plasticized neutralized acid polymer composition may have a Shore D hardness of 25 or 28 or 30 or 32 or 35 or 36 or 38 or 40 or 42 or 45 or 48 or 50 or 54 or 56 or 60, or a Shore D hardness within a range having a lower limit and an upper limit of these values.

In another particular embodiment, the plasticized neutralized acid polymer composition may have a Shore C hardness of 30 or 33 or 35 or 37 or 39 or 41 or 43 or 62 or 64 or 66 or 68 or 71 or 73 or 75, or a Shore C hardness within a range having a lower limit and an upper limit of these values.

In another particular embodiment, the plasticized neutralized acid polymer composition may have a Shore D hardness of 42 or 44 or 47 or 51 or 53 or 58 or 60 or 65 or 72 or 77 or 80 or 84 or 91 or 95, or a Shore D hardness within a range having a lower limit and an upper limit of these values.

In another particular embodiment, the plasticized neutralized acid polymer composition may have a Shore C hardness of 57 or 59 or 62 or 66 or 72 or 75 or 78 or 84 or 87 or 90 or 93 or 95 or 97 or 99, or a Shore C hardness within a range having a lower limit and an upper limit of these values.

In one non-limiting example, a golf ball of the invention comprises: (a) a center having a diameter of from 0.50 inches to 1.30 inches and a center hardness of 50 Shore C or greater; (b) an outer core layer having a surface hardness of 75 Shore C or greater; (c) an inner cover layer having a material hardness less than the surface hardness of the outer core layer; and (d) an outer cover layer; wherein one of the center and the outer core layer comprises a plasticized neutralized acid polymer composition; and wherein one of the center composition and the outer core layer comprises a polymer composition that differs from the plasticized neutralized acid polymer composition.

In one such particular embodiment, a second surface hardness of the center is greater than the surface hardness. Alternatively, the second surface hardness of the center may be less than the surface hardness. In a different embodiment, the center may have a center hardness of 75 Shore C or greater, while the outer core layer has a surface hardness of 50 Shore C or greater.

In one such embodiment, the polymer composition is a non-plasticized neutralized acid polymer composition, and the plasticized neutralized acid polymer composition therefore has a flexural modulus that is at least 10% less than a modulus of the polymer composition. In such an embodiment, the plasticized neutralized acid polymer composition may alternatively have a flexural modulus that is at least 25% less than a modulus of the polymer composition. The transition glass temperature Tg of the plasticized neutralized acid polymer composition would also be less than Tg of the non-plasticized neutralized acid polymer composition.

In another embodiment, the polymer composition is a differing plasticized neutralized acid polymer composition that differs from the plasticized neutralized acid polymer composition with respect to the type or amount of any or combinations of components (a), (b), (c), and/or (d). In yet other embodiments, the polymer composition is a conventional polymer composition such as a rubber-based, material, a thermoset or thermoplastic polyurethane, ionomer, etc. In both such embodiments, the flexural modulus and/or Tg value of the plasticized neutralized acid polymer composition may be greater than or less than the flexural modulus and/or Tg value of the polymer composition, depending on the specific polymer composition selected and the playing characteristics being targeted.

In a different embodiment, a golf ball of the invention comprises a subassembly, an inner cover layer disposed about the subassembly, and an outer cover layer disposed about the inner cover layer, wherein at least one of the inner cover layer and outer cover layer is the at least one layer. In such embodiments, the subassembly may have any known construction such as a single core, a dual core (center surrounded by outer core layer), or core having any number of layers, or a core surrounded by any number of intermediate layers.

The properties such as core diameter, intermediate layer and cover layer thickness, hardness, and compression have been found to affect play characteristics such as spin, initial velocity, and feel of the present golf balls.

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight.

The preferred diameter of the golf balls is from about 1.680 inches to about 1.800 inches, more preferably from about 1.680 inches to about 1.760 inches. A diameter of from about 1.680 inches (43 mm) to about 1.740 inches (44 mm) is most preferred; however diameters anywhere in the range of from 1.700 to about 1.950 inches can be used.

Preferably, the overall diameter of the core and all intermediate layers is about 80 percent to about 98 percent of the overall diameter of the finished ball. The core may have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

The cover typically has a thickness to provide sufficient strength, good performance characteristics, and durability. In one embodiment, the cover thickness is from about 0.02 inches to about 0.12 inches, preferably about 0.1 inches or less. For example, when part of a two-piece ball according to invention, the cover may have a thickness ranging from about 0.03 inches to about 0.09 inches. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.015 inches to about 0.06 inches. In another embodiment, the intermediate layer thickness is about 0.05 inches or less, more preferably about 0.01 inches to about 0.045 inches.

The plasticized neutralized acid polymer compositions of the invention may be used in any layer of a golf ball. Accordingly, the golf ball construction, physical properties, and resulting performance may vary depending on the layer(s) of the ball that include the compositions of the invention.

The at least one layer comprising the plasticized neutralized acid polymer compositions of the invention may have a hardness of about 20 Shore D to about 75 Shore D. In one embodiment, the hardness of a solid sphere formed from a composition of the invention ranges from about 30 Shore D to about 60 Shore D. In another embodiment, the hardness ranges from about 40 Shore D to about 50 Shore D.

In another aspect of the present invention, golf ball layers formed from the plasticized neutralized acid polymer compositions of the invention may have a hardness of about 45 Shore C to about 85 Shore C. In one embodiment, the golf ball layer formed of the compositions of the invention has a hardness of about 50 Shore C to about 80 Shore C. In another embodiment, the golf ball layer formed of the compositions of the invention has a hardness of about 60 Shore C to about 75 Shore C.

The cores included in the golf balls of the present invention may have varying hardnesses depending on the particular golf ball construction. In one embodiment, the core hardness is about 20 Shore D to about 60 Shore D. In another embodiment, the core hardness is about 30 Shore D to about 50 Shore D.

The intermediate layers of the present invention may also vary in hardness depending on the specific construction of the ball. In one embodiment, the hardness of the intermediate layer is about 30 Shore D to about 65 Shore D. In another embodiment, the hardness of the intermediate layer is about 40 Shore D to about 55 Shore D.

As with the core and intermediate layers, the cover hardness may vary depending on the construction and desired characteristics of the golf ball. In one embodiment, the hardness of the cover layer is about 40 Shore D to about 65 Shore D. In another embodiment, the hardness of the cover layer is about 50 Shore D to about 60 Shore D.

Embodiments are envisioned wherein the at least one layer is a coating layer or tie layer, or moisture barrier layer. One or more coating layer may have a combined thickness of from about 0.1 µm to about 100 µm, or from about 2 µm to about 50 µm, or from about 2 µm to about 30 µm. Meanwhile, each coating layer may have a thickness of from about 0.1 µm to about 50 µm, or from about 0.1 µm to about 25 µm, or from about 0.1 µm to about 14 µm, or from about 2 µm to about 9 µm, for example. It is envisioned that a plasticized neutralized acid polymer composition moisture barrier layer or tie layer may have any thickness known in the art with respect thereto.

The golf balls of the present invention may be painted, coated, or surface treated for further benefits. For example, golf balls may be coated with urethanes, urethane hybrids, ureas, urea hybrids, epoxies, polyesters, acrylics, or combinations thereof in order to obtain an extremely smooth, tack-free surface. If desired, more than one coating layer can be used. The coating layer(s) may be applied by any suitable method known to those of ordinary skill in the art. Any of the golf ball layers may be surface treated by conventional methods including blasting, mechanical abrasion, corona discharge, plasma treatment, and the like, and combinations thereof.

The melt flow index of compositions herein and in particular neutralized acid polymer compositions of the invention may be measured using ASTM D-1238, condition E, at 190° C., using a 2160 gram weight.

As used herein, "modulus" refers to flexural modulus as measured using a standard flex bar according to ASTM D790-B.

Hardness measurements are made pursuant to ASTM D-2240 "Indentation Hardness of Rubber and Plastic by Means of a Durometer." The hardness of a core, cover, or intermediate layer may be measured directly on the surface of a layer or alternatively, at the midpoint of the given layer in a manner similar to measuring the geometric center hardness of a core layer that has been cut in half and the approximate geometric center of the core is measured perpendicular to the sectioned core. For example, the hardness of the inner cover layer may be measured at the midpoint of the layer after the ball has been cut in half. A midpoint hardness measurement is preferably made for the inner and intermediate cover layers. The midpoint hardness of a cover layer is taken at a point equidistant from the inner surface and outer surface of the layer to be measured. Once one or more cover or other layers surround a layer of interest, the exact midpoint may be difficult to determine, therefore, for the purposes of the present invention, the measurement of "midpoint" hardness of a layer is taken within plus or minus 1 mm of the measured midpoint of the layer. A surface hardness measurement is preferably made for the outer cover layer. In these instances, the hardness is measured on the outer surface (cover) of the ball.

In turn, material hardness is measured according to ASTM D2240 and generally involves measuring the hardness of a flat "slab" or "button" formed of the material. It should be understood that there is a fundamental difference between "material hardness" and "hardness as measured directly on a golf ball." Hardness as measured directly on a golf ball (or other spherical surface) typically results in a different hardness value than material hardness. This difference in hardness values is due to several factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other. Unless stated otherwise, the hardness values given herein for cover materials are material hardness values measured according to ASTM D2240, with all values reported following 10 days of aging at 50% relative humidity and 23° C.

Compression is an important factor in golf ball design. For example, the compression of the core can affect the ball's spin rate off the driver and the feel. In fact, the compositions and methods of the present invention result in golf balls having increased compressions and ultimately an overall harder ball. The harder the overall ball, the less deformed it becomes upon striking, and the faster it breaks away from the golf club.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring.

The Atti compression of golf balls formed from the compositions of the present invention may range from about 50 to about 120. In one embodiment, the Atti compression of golf balls formed from the compositions of the present invention range from about 55 to about 100. In another embodiment, the Atti compression of golf balls formed from the compositions of the present invention range from about 70 to about 90.

The glass transition in a polymer is a temperature range below which a polymer is relatively brittle and above which it is rubber-like. In addition to lowering the Tg, a plasticizer may also reduce the tan δ in the temperature range above the Tg. The Tg of a polymer is measured by a Differential Scanning calorimeter or a Dynamic Mechanical Analyzer (DMA) and the DMA is used to measure tan δ. The plasticizer may also reduce the hardness and compression of the composition when compared to its non-plasticized condition. Accordingly, a plasticized neutralized acid polymer composition will generally have lower Tg, flex modulus, hardness, and other physical properties such as compression than its non-plasticized counterpart.

The coefficient of restitution or COR of a golf ball is a measure of the amount of energy lost when two objects collide. The COR of a golf ball indicates its ability to rebound and accounts for the spring-like feel of the ball after striking. As used herein, the term "coefficient of restitution" (COR) is calculated by dividing the rebound velocity of the golf ball by the incoming velocity when a golf ball is shot out of an air cannon. The COR testing is conducted over a range of incoming velocities and determined at an inbound velocity of 125 ft/s.

In this aspect, the present invention contemplates golf balls formed form the neutralized acid polymer compositions of the present invention having CORs from about 0.700 to about 0.850 at an inbound velocity of about 125 ft/sec. In one embodiment, the COR is about 0.750 to about 0.800, preferably about 0.760 to about 0.790, and more preferably about 0.770 to about 0.780. In another embodiment, the ball has a COR of about 0.800 or greater. In yet another embodiment, the COR of the balls of the invention is about 0.800 to about 0.815.

Solid spheres (1.55 inches) formed of the compositions of the invention may have a COR of at least about 0.790, preferably at least about 0.800. For example, the COR of solid spheres formed from the neutralized acid polymer compositions of the invention ranges from about 0.810 to about 0.830. In one embodiment, a solid sphere formed from the neutralized acid polymer compositions of the invention has a COR of about 0.800 to about 0.825. In another embodiment, the COR of the solid sphere ranges from about 0.805 to about 0.815.

Evaluating subassembly/golf ball impact or shear durability generally may involve launching a predetermined number of identical subassemblies/finished golf balls using identical launch means (e.g., hitting machine or air cannon) toward the same target (e.g., catching net or steel plate), with each subassembly/golf ball automatically returning to hitting/launching position and then being hit again or re-launched a pre-set number of times such as 150, 400, etc., or until the subassembly/golf ball fails, as judged by visual observations or a significant drop in COR. A minimum sample size should be set (such as 6, 12, etc. subassemblies/golf balls, and hitting/launching can occur at room temperature, i.e., approximately 22° C.

In one particular approach, degree of adhesion and durability of inventive golf balls can be evaluated by first making a predetermined total number of golf balls that are identical except for (i) the presence/absence of low molecular weight non-acid wax in a casing layer/inner cover layer as well as (ii) the amount of low molecular weight non-acid wax included in the casing layer/inner cover layer. Then, all golf balls are separated into several identical groups, each group containing the same number and types of such golf balls. The groups of golf balls are tested at predetermined time intervals by firing each golf ball within a group at the designated time using a "Shear Impact Air Cannon" at approximately 135 ft./sec. into a grooved plate at an angle of about 35° from horizontal. Subsequently, all golf balls of every group are visually examined for any delamination of the cover from the casing layer. Delamination evidences poor durability and poor adhesion between layers, which can result from migration of ingredients within and between adjacent layers (inter-layer and/or intra-layer).

In other embodiments, the quality of adhesion between two layers such as a cover and casing layer can be evaluated by creating a sample from each subassembly/golf ball as follows. First, a ½" wide strip centered about the circumference of each ball may be cut. Next, an approximate 1" tab of cover material can be manually prepared by making a cross cut in the strip and peeling the cover material from the underlying layer. Then, each golf ball may be placed in a freely rotating jig fitted with a rotary encoder and the jig is mounted to the base of a universal test frame. Finally, each prepared tab can then be clamped into jaws attached to an appropriately sized load cell.

Testing may be conducted by advancing the crosshead at 0.5 inches per minute with data recorded every 0.1° of rotational motion of the test fixture. The load cell records the force while the rotary encoder records the rotational distance of each ball, which is then converted to linear distance peeled and used to determine the length of the pull. After discarding any starting slack in the system, peel strength may be reported by taking the average lbf on the load cell of the remaining data divided by the strip width of 0.5".

Golf balls of the present invention will typically have dimple coverage of 60% or greater, preferably 65% or greater, and more preferably 75% or greater. The United States Golf Association specifications limit the minimum size of a competition golf ball to 1.680 inches. There is no specification as to the maximum diameter, and golf balls of any size can be used for recreational play. Golf balls of the present invention can have an overall diameter of any size. The preferred diameter of the present golf balls is from 1.680 inches to 1.800 inches. More preferably, the present golf balls have an overall diameter of from 1.680 inches to 1.760 inches, and even more preferably from 1.680 inches to 1.740 inches.

Golf balls of the present invention preferably have a moment of inertia ("MOI") of 70-95 g·cm$^2$, preferably 75-93 g·cm$^2$, and more preferably 76-90 g·cm$^2$. For low MOI embodiments, the golf ball preferably has an MOI of 85 g·cm$^2$ or less, or 83 g·cm$^2$ or less. For high MOI embodiment, the golf ball preferably has an MOI of 86 g·cm$^2$ or greater, or 87 g·cm$^2$ or greater. MOI is measured on a model MOI-005-104 Moment of Inertia Instrument manufactured by Inertia Dynamics of Collinsville, Conn. The instrument is connected to a PC for communication via a COMM port and is driven by MOI Instrument Software version #1.2.

Thermoplastic layers herein may be treated in such a manner as to create a positive or negative hardness gradient. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

Advantageously, the compositions of the present invention provide excellent physical properties such as heat stability as well as processability (excellent melt flow) and meanwhile produce a golf ball having desired properties such a CoR and compression and with soft feel.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising at least one layer consisting of a plasticized neutralized acid polymer composition consisting of a mixture of: (a) at least one low molecular weight acid-containing wax; (b) at least one non-acid-polymer, of which at least one is a low molecular weight non-acid wax; (c) at least one organic acid or salt thereof; and (d) at least one plasticizer;
    wherein each low molecular weight acid-containing wax has a molecular weight of from about 500 to about 30,000;
    wherein the mixture contains at least 70 percent of neutralized acid groups; and
    wherein the mixture has a melt flow index of at least 0.5 g/10 min.

2. The golf ball of claim 1, wherein the low molecular weight non-acid wax is selected from the group consisting of: high density oxidized polyethylene homopolymers; ethylene maleic anhydride copolymers; polypropylene maleic anhydride copolymers; polypropylene homopolymers; ethylene-vinyl acetate copolymers; high density oxidized homopolymers; oxidized copolymers; polyethylene micronized waxes; polytetrafluoroethylene micronized waxes; emulsifiable low molecular weight non-acid waxes; non-emulsifiable low molecular weight non-acid waxes; chemically modified low molecular weight non-acid waxes, and combinations thereof.

3. The golf ball of claim 1, wherein at least one low molecular weight non-acid wax is included in a blend of non-acid-polymers in an amount of at least 50 wt. % based on the total weight of the blend.

4. The golf ball of claim 1, wherein at least one low molecular weight non-acid wax is included in a blend of non-acid-polymers in an amount of less than 50 wt. % based on the total weight of the blend.

5. The golf ball of claim 4, wherein the at least one low molecular weight non-acid wax is included in the blend in an amount of from about 10 wt. % to 50 wt. % based on the total weight of the blend.

6. The golf ball of claim 4, wherein the at least one low molecular weight non-acid wax is included in the mixture in an amount of no greater than 35 wt. % based on the total weight of the mixture.

7. The golf ball of claim 4, wherein the at least one low molecular weight non-acid wax is included in the mixture in an amount of from about 5 wt. % to about 30 wt. % based on the total weight of the mixture.

8. The golf ball of claim 1, wherein component (a) is included in an amount of 5 to 95 parts of each 100 parts of components (a) and (b) combined.

9. The golf ball of claim 8, wherein component (b) is included in an amount of from about 5 to 95 parts of each 100 parts of components (a) and (b) combined.

10. The golf ball of claim 9, wherein component (c) is included in an amount of from 5 to 100 parts per 100 parts of components (a) and (b) combined.

11. The golf ball of claim 10, wherein component (d) may be included in an amount of from about 1.0 parts to about 300 parts per 100 parts of components (a) and (b) combined.

12. The golf ball of claim 11, wherein component (a) is included in the mixture in an amount of about 70-80 wt % of each 100 wt % of components (a) and (b) combined, component (b) is included in the mixture in an amount of about 20-30 wt % of each 100 wt % of components (a) an (b) combined, component (c) is included in the mixture in an amount of about 35-45 wt % per 100 wt % of components (a) and (b) combined; and component (d) is included in the mixture in an amount of about 0.5-80 wt % of each 100 wt % of components (a) and (b) and (d) combined.

13. The golf ball of claim 11, wherein the mixture contains at least 80 percent of neutralized acid groups.

14. The golf ball of claim 11, wherein the mixture contains at least 90 percent of neutralized acid groups.

15. The golf ball of claim 11, wherein the mixture contains 100 percent of neutralized acid groups.

16. The golf ball of claim 11, wherein the mixture contains an amount of a cation source greater than an amount sufficient to neutralize about 100% of all acid groups present.

17. The golf ball of claim 11, wherein the at least one organic acid or salt thereof is a fatty acid or fatty acid salt, or blends thereof.

18. The golf ball of claim 17, wherein the at least one organic acid or salt thereof is selected from the group consisting of Magnesium Oleate, Magnesium Stearate, or combinations thereof.

19. The golf ball of claim 11, wherein the low molecular weight acid-containing wax is selected from the group consisting of ethylene acrylic acid copolymers, ethylene-meth acrylic acid copolymers, oxidized polyethylene, or combinations thereof.

20. The golf ball of claim 19, wherein each low molecular weight acid-containing wax has a molecular weight of from about 500 to about 7,000.

21. The golf ball of claim 19, wherein the non-acid polymer is selected from the group consisting of ethylene acrylate copolymers; polyether esters; polyether amines; or combinations thereof.

22. The golf ball of claim 21, wherein the plasticizer is selected from the group consisting of fatty acid esters, phosphate esters, or mixtures thereof.

23. The golf ball of claim 22, wherein the melt flow index of the mixture is greater than 1.0 g/10 min.

24. The golf ball of claim 22, wherein the melt flow index of the mixture is from about 1.0 g/10 min to about 4 g/10 min.

25. The golf ball of claim 23, wherein the golf ball has a CoR of from about 0.740 to about 0.840.

26. The golf ball of claim 24, wherein the golf ball has a compression of from about 40 to about 135.

27. The golf ball of claim 11, wherein each low molecular weight acid-containing wax has a Brookfield viscosity of about 1100 cps or less at 140° C. and a density of less than 0.96 g/cc.

28. The golf ball of claim 16, comprising a center and an outer core layer disposed about the center, wherein at least one of the center and the outer core layer is the at least one layer.

29. The golf ball of claim 22, wherein the center has a diameter of from 0.50 inches to 1.30 inches and a center hardness of 50 Shore C or greater, and the outer core layer has a surface hardness of 75 Shore C or greater, and an inner cover layer has a material hardness less than the surface hardness of the outer core layer; and an outer cover layer is disposed about the inner cover layer.

30. The golf ball of claim 22, wherein the center has a diameter of from 0.50 inches to 1.30 inches and a center hardness of 75 Shore C or greater, and the outer core layer has a surface hardness of 50 Shore C or greater, and an inner cover layer has a material hardness less than the surface hardness of the outer core layer; and an outer cover layer is disposed about the inner cover layer.

31. The golf ball of claim 16, comprising a subassembly, an inner cover layer disposed about the subassembly, and an outer cover layer surrounding the inner cover layer, wherein at least one of the inner cover layer and outer cover layer is the at least one layer.

32. The golf ball of claim 1, wherein the mixture has a melt flow index of at least 1.0 g/10 min.

* * * * *